United States Patent [19]

Tetzlaff et al.

[11] Patent Number: 5,041,734

[45] Date of Patent: Aug. 20, 1991

[54] DOSIMETER READING APPARATUS WITH OPTICAL LASER CONVERTER

[75] Inventors: Wolfgang Tetzlaff; James W. Hoelscher; Peter F. Braunlich, all of Pullman, Wash.; Carl D. Bloomsburg, Moscow, Id.

[73] Assignee: International Sensor Technology, Inc., Pullman, Wash.

[21] Appl. No.: 371,553

[22] Filed: Jun. 26, 1989

Related U.S. Application Data

[63] Continuation-in-part of Ser. No. 365,180, Jun. 12, 1989, Pat. No. 4,906,848, which is a continuation of Ser. No. 882,953, Jul. 7, 1986, Pat. No. 4,839,518, which is a continuation-in-part of Ser. No. 652,829, Sep. 20, 1984, Pat. No. 4,638,163, and a continuation-in-part of Ser. No. 336,015, Apr. 10, 1989.

[51] Int. Cl.$^5$ .............................................. G01T 1/115
[52] U.S. Cl. .................................. 250/484.1; 250/337; 250/354.1; 250/358.1
[58] Field of Search ................ 250/337, 461.1, 354.1, 250/459.1, 458.1, 327.2, 484.1 R, 484.1 A, 484.1 B, 484.1 C, 328

[56] References Cited

U.S. PATENT DOCUMENTS

| | | | |
|---|---|---|---|
| 3,761,710 | 9/1973 | Yamashita et al. | 250/484.1 |
| 3,963,351 | 6/1976 | Chance et al. | 250/458.1 |
| 4,465,936 | 8/1984 | Ishiguro et al. | 250/484.1 |
| 4,507,562 | 3/1985 | Gasiot et al. | 250/484.1 |
| 4,638,163 | 1/1987 | Braunlich et al. | 250/337 |
| 4,656,358 | 4/1987 | Divens et al. | 250/372 |
| 4,661,708 | 4/1987 | Agano | 250/327.2 |
| 4,757,199 | 7/1988 | Horikawa | 250/327.2 |
| 4,839,518 | 6/1989 | Braunlich et al. | 250/337 |
| 4,906,848 | 3/1990 | Braunlich et al. | 250/337 |

*Primary Examiner*—Constantine Hannaher
*Assistant Examiner*—Edward J. Glick
*Attorney, Agent, or Firm*—Wells, St. John & Roberts

[57] ABSTRACT

Disclosed is a laser dosimeter reading apparatus having a controllable optical laser converter for providing multiple stimulating laser beams. The convertible laser dosimeter reader can be used to stimulate or otherwise treat dosimeter elements to perform two or more distinct processes on a particular dosimeter element. Additionally, the convertible dosimeter reader can be used to read multiple different types of dosimeter elements contained on a single dosimeter badge, thereby allowing a badge to be read in a multi-stage reading operation in a single dosimeter reader which is preferably automated. The optical laser converter includes a converter block assembly which defines multiple optical pathways therethrough. The convert block assembly is movable between different positions to align the different optical pathways with an incoming laser beam. The output laser beams from the different optical pathways of the converter have differing laser beam characteristics suitable for different types of dosimeters or differing treatment processes. The output beams from the optical pathways are preferably passed through an imaging assembly which images the beams onto the dosimeters being stimulated or for other uses as the laser beam converter may be utilized. The disclosure also includes methods for converting a laser beam and for reading radiation dosimeters.

61 Claims, 15 Drawing Sheets

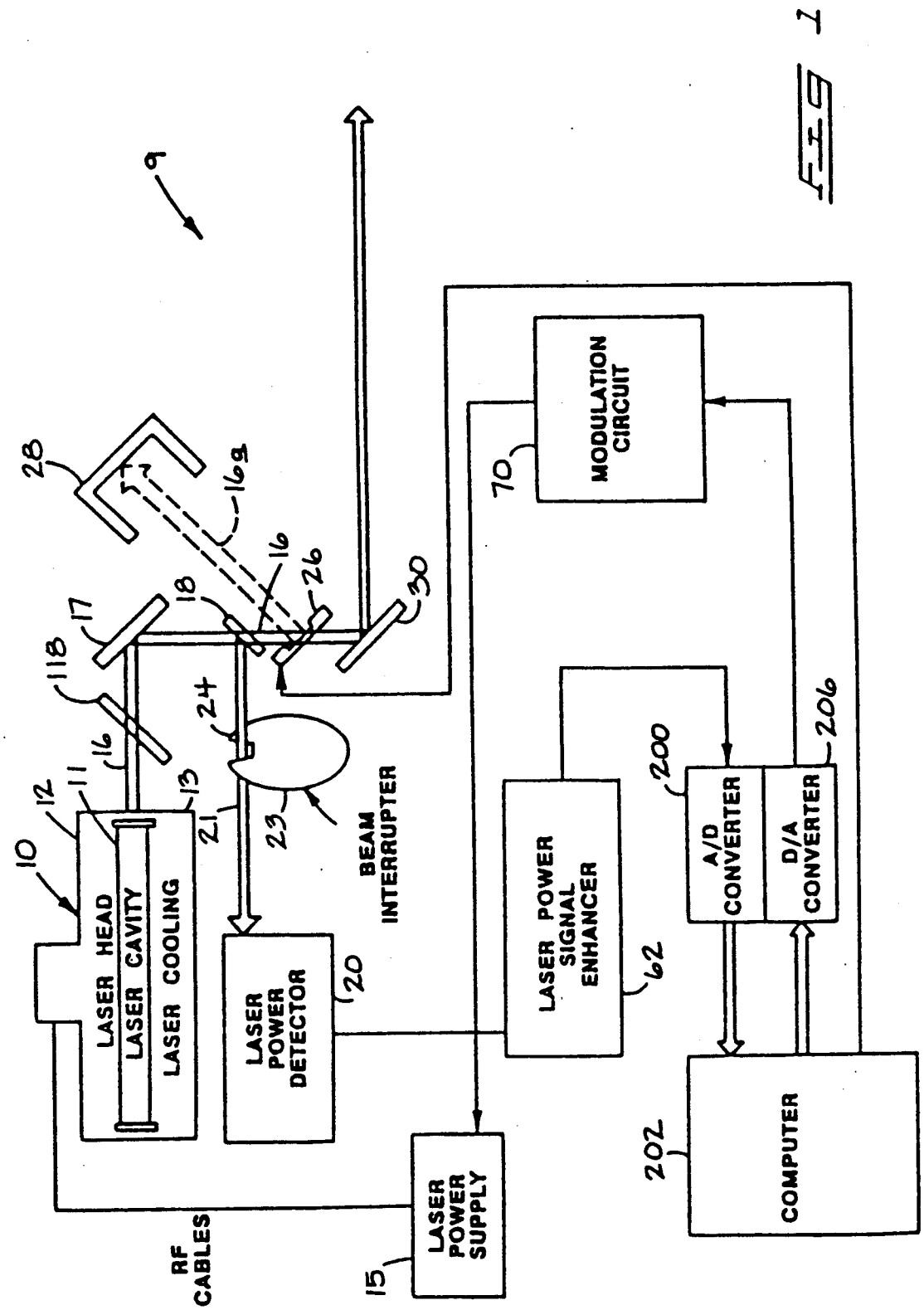

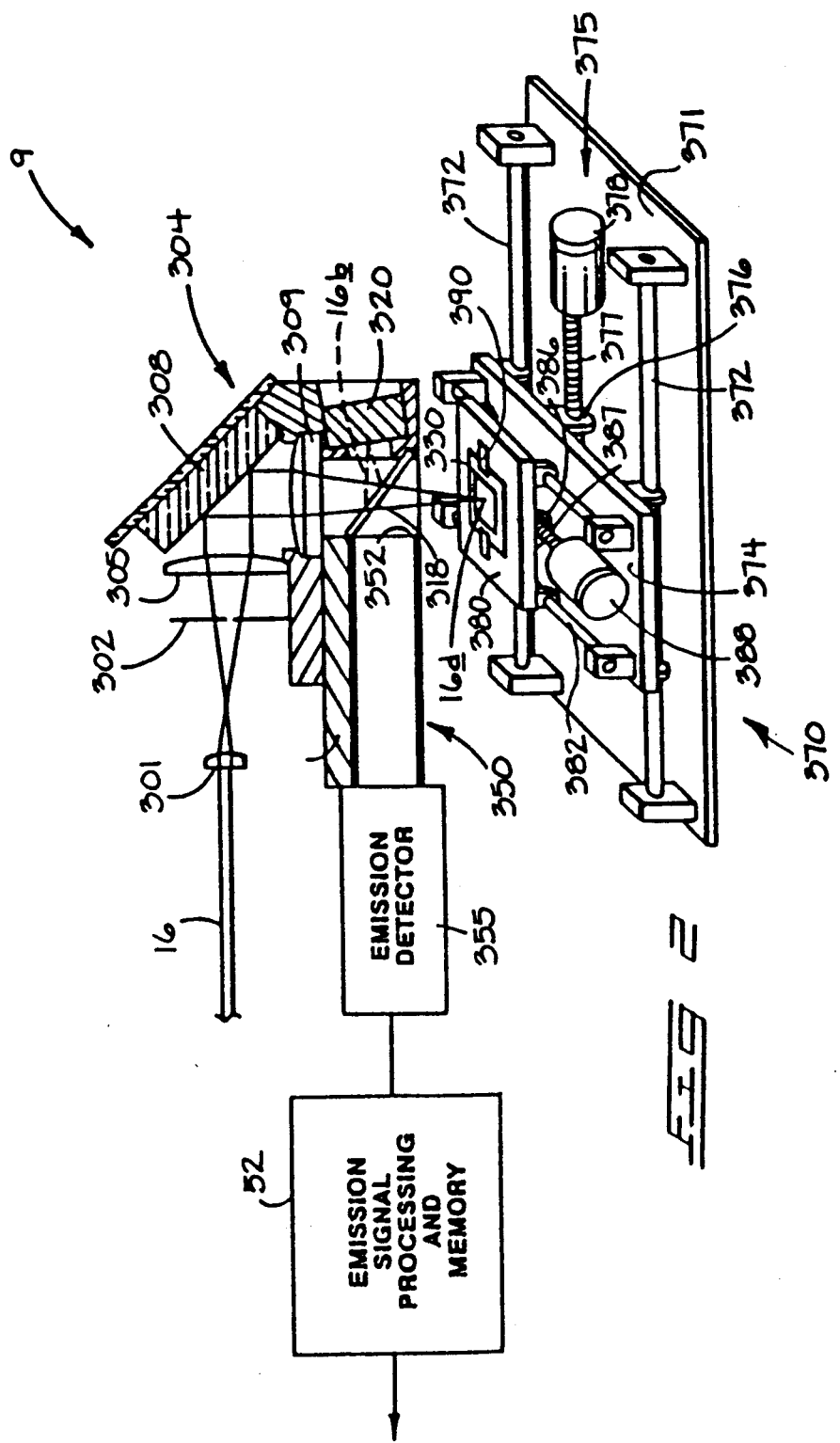

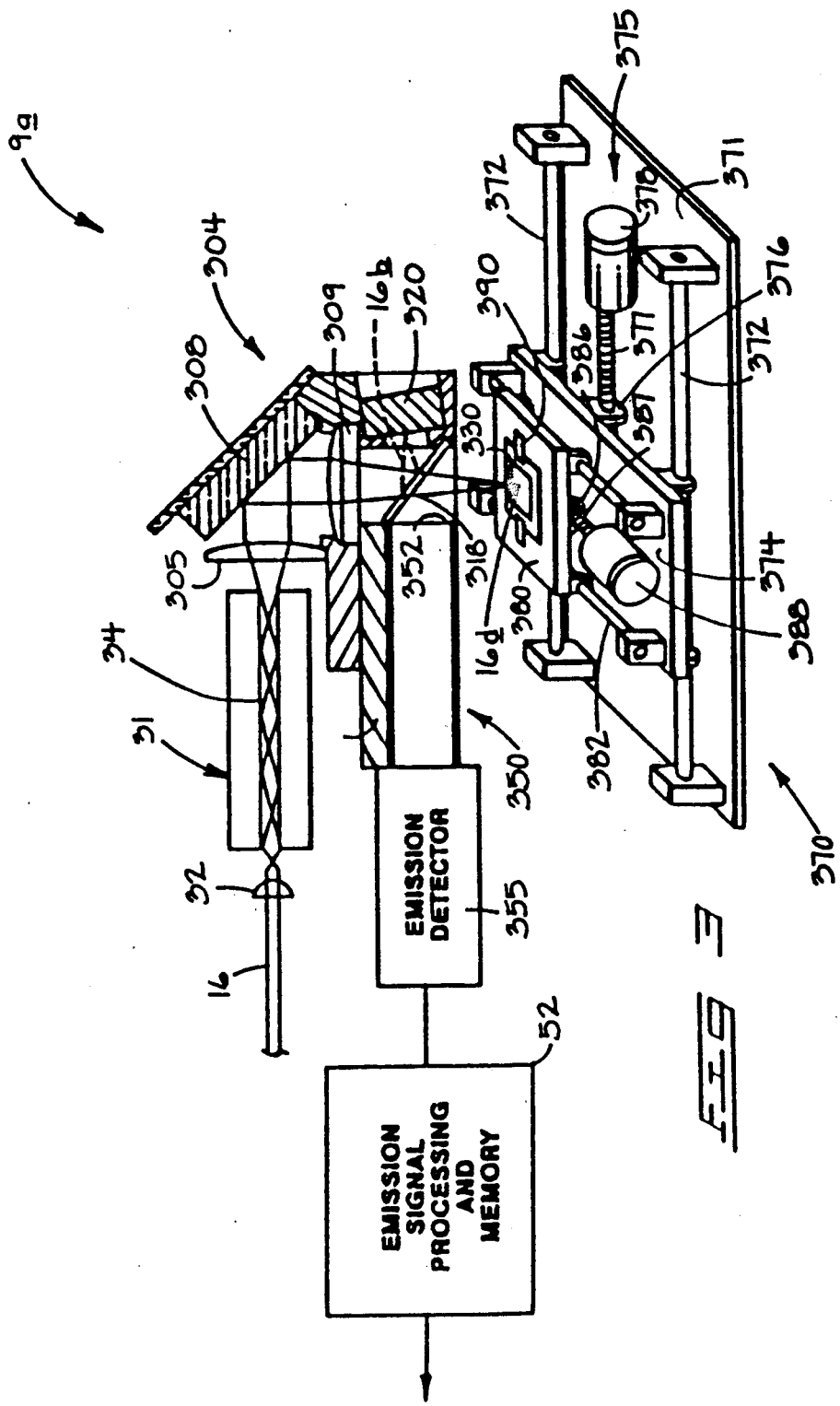

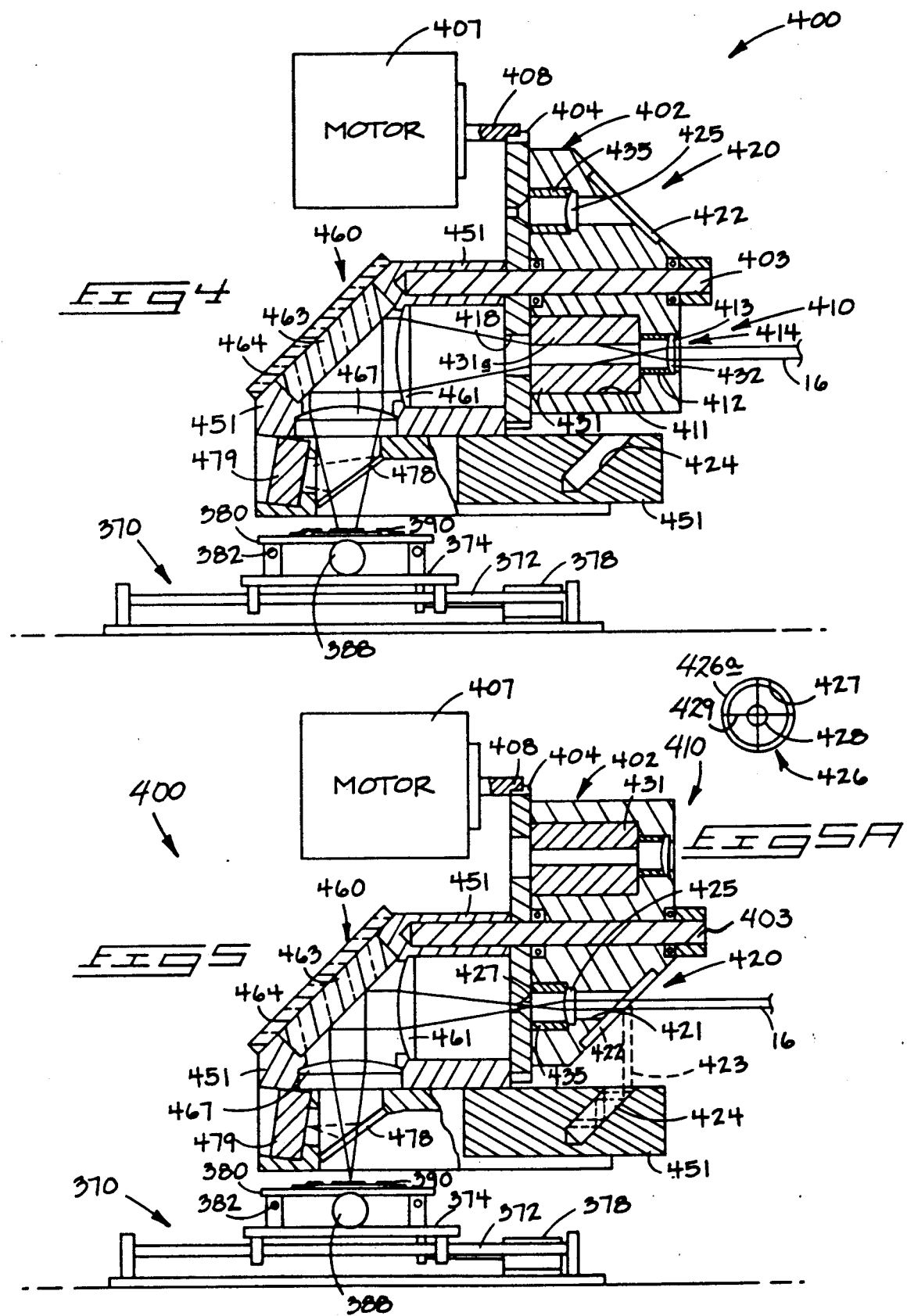

DOSIMETER READING APPARATUS WITH OPTICAL LASER CONVERTER

This invention was made with government support under Contract No. N60921-88-C-0085, awarded by the U.S. Department of Defense. The government has certain rights in this invention.

CROSS-REFERENCE TO RELATED APPLICATIONS

This application is a continuation-in-part of co-pending U.S. patent application Ser. No. 365,180, entitled "Apparatuses and Methods for Laser Reading of Phosphors", filed June 12, 1989; U.S. Pat. No. 4,906,848 which was a continuation of U.S. patent application Ser. No. 882,953, entitled "Apparatuses and Methods for Laser Reading of Thermoluminescent Phosphors", filed July 7, 1986, now U.S. Pat. No. 4,839,518, issued June 13, 1989; which was a continuation-in-part of U.S. patent application Ser. No. 652,829, filed Sept. 20, 1984, now U.S. Pat. No. 4,638,163, issued Jan. 20, 1987. Such application and patents are hereby incorporated hereinto by reference in their entirety as if set forth in full.

This application is further a continuation-in-part of co-pending U.S. patent application Ser. No. 336,015, entitled "Radiation Dosimetry By Counting Differentially Ionized Sample Areas From Heavy Charged Particle Events", filed Apr. 10, 1989. Such application is hereby incorporated hereinto by reference in its entirety as if set forth in full.

TECHNICAL FIELD

The technical field of this invention is radiation dosimeter reading apparatus and methods using laser beam optical converters for producing multiple types of stimulating beams.

BACKGROUND OF THE INVENTION

It is well-known in the art that certain materials called phosphors can be irradiated with high energy ionizing radiation, and then subsequently stimulated to produce an emission. Thermoluminescent phosphors are currently in widespread use in radiation dosimeters used to measure the amount of incident radiation to which people, animals, plants and other things are exposed. Thermoluminescent dosimeters are widely used by workers in the nuclear industries to provide a constant monitor for measuring exposure to radiation.

Phosphors are excited by energetic radiation such as ultraviolet, X-ray, gamma, and other forms of radiation. Such ionizing radiation causes electrons within the thermoluminescent material to become highly energized. The nature of thermoluminescent materials causes these high energy electrons to be trapped at relatively stable higher energy levels. The electrons stay at these higher energy levels until additional energy, usually in the form of heat, is supplied which releases the trapped electrons, thereby allowing them to fall back to a lower energy state. The return of the electrons to a lower energy state causes a release of energy primarily in the form of visible light which is ordinarily termed a luminescent emission.

The use of thermoluminescent phosphors in personnel dosimeters has led to demand for a large number of dosimeters which must be read on a routine basis in order to monitor exposure of persons or other objects to ionizing radiation. Because of the substantial numbers and the relatively slow reading techniques currently employed, the job of reading dosimeters becomes very time consuming and costly.

There are four commonly known methods of heating thermoluminescent material in order to release the trapped electrons and provide the luminescent emission which is measured as an indication of the amount of ionizing radiation to which the dosimeter was exposed. The first and most common method for heating thermoluminescent phosphors is by contact heating. The second method is heating using a hot gas stream which is impinged upon the phosphor. The third method uses radiant energy in the form of infrared beams which heat the thermoluminescent phosphor. The fourth method uses infrared laser beams to provide the necessary heat for luminescent emission.

Novel methods and apparatuses for laser reading of thermoluminescent phosphor dosimeters are disclosed in detail in U.S. Pat. Nos. 4,638,163 and 4,839,518 incorporated by reference hereinabove. One of the inventors of this invention and his colleagues have developed laser reading techniques and dosimeters, as disclosed in an article entitled "Laser Heating In Thermoluminescence Dosimetry," by J. Gasiot, P. Braunlich, and J. P. Fillard, *Journal of Applied Physics*, Vol. 53, No. 7, July 1982. In that article, the authors describe how thin layers of thermoluminescent phosphors can be precipitated onto glass microscope cover slides and used as laser readable dosimeters. Powder layers of the phosphors were in some cases coated with a thin film of high temperature polymers. The content of said article is hereby incorporated hereinto by reference.

Laser heating of thermoluminescent phosphors is superior because of the greatly decreased heating times and associated increased processing rates which are possible. Release of stored luminescent energy within a short period of time greatly improves signal-to-noise ratios and thus the accuracy of dosimeter measurements.

It is desirable in the monitoring of radiation dosage to discriminate between different types of radiation. In the case of some types of radiation it is desirable or necessary to use specific forms of dosimeters for detecting and measuring that type of radiation as distinct from other types of dosimeters used for detecting other forms of radiation. For example, the measurement of gamma radiation can be accomplished using a single thermoluminescent dosimeter element which is heated uniformly to a desired temperature thus causing a thermoluminescent emission to occur. The thermoluminescent emission is measured and the resulting luminescence is interpreted and has been found useful as an accurate measurement of the amount of ionizing radiation to which the dosimeter was exposed. Alternatively, it is possible to heat a large number of small localized areas of a dosimeter to identify the approximate number of localized areas which have been ionized by the impingement of a heavy charge particle. The proportion of areas which have experienced such a heavy charged particle event can used as an indication of the amount of heavy particle radiation to which a dosimeter has been exposed. Such radiation dose measurement techniques are appropriate for radiations such as alpha particles and neutrons among others. The methodology of such dose measurement techniques is further explained in the incorporated by reference parent application Ser. No. 336,015.

In addition to the heat stimulation of phosphors it is also possible to stimulate them with laser beams in a phenomenon call optically stimulated luminescence. In optically stimulated luminescence the laser beam is directed in an intense beam having high power for very brief periods of time. This form of laser stimulation is explained in U.S. Pat. No. 4,507,562 which is hereby incorporated by reference.

In light of these differing approaches for measuring gamma radiation versus heavy particle radiation, and other differing laser dosimeter reading techniques, it has not been practical to include dosimeters on a single badge having differing stimulating laser beam requirements and accordingly some forms of radiation have not been monitored. It has further not been possible to use a single laser dosimeter reader to stimulate radiation dosimeters having distinct beam requirements. Accordingly, there has been a need in the art for laser dosimeter reading equipment which can read multiple types of radiation dosimeters having differing stimulating beam requirements using a single laser source.

BRIEF DESCRIPTION OF THE DRAWINGS

The preferred embodiment of the invention is illustrated in the accompanying drawings, in which:

FIG. 1 is a diagrammatic view show portions of a preferred dosimeter reading apparatus according to this invention.

FIG. 2 is a further diagrammatic representation of additional portions of the dosimeter reading apparatus shown in FIG. 1.

FIG. 3 is a diagrammatic view of an alternative embodiment showing portions similar to the portions shown in FIG. 2 with an additional beam equalizer component shown.

FIG. 4 is a further diagrammatic view showing the basic concepts of the optical laser converter according to this invention.

FIG. 5 is a diagrammatic view similar to FIG. 4 with the optical laser converter repositioned to provide a different optical path for the laser beam, and a different resulting output laser beam compared to that shown in FIG. 4.

FIG. 5A is a detail view showing a preferred aperture construction for use in the invention.

DETAILED DESCRIPTION OF THE PREFERRED EMBODIMENTS

Figure 6:
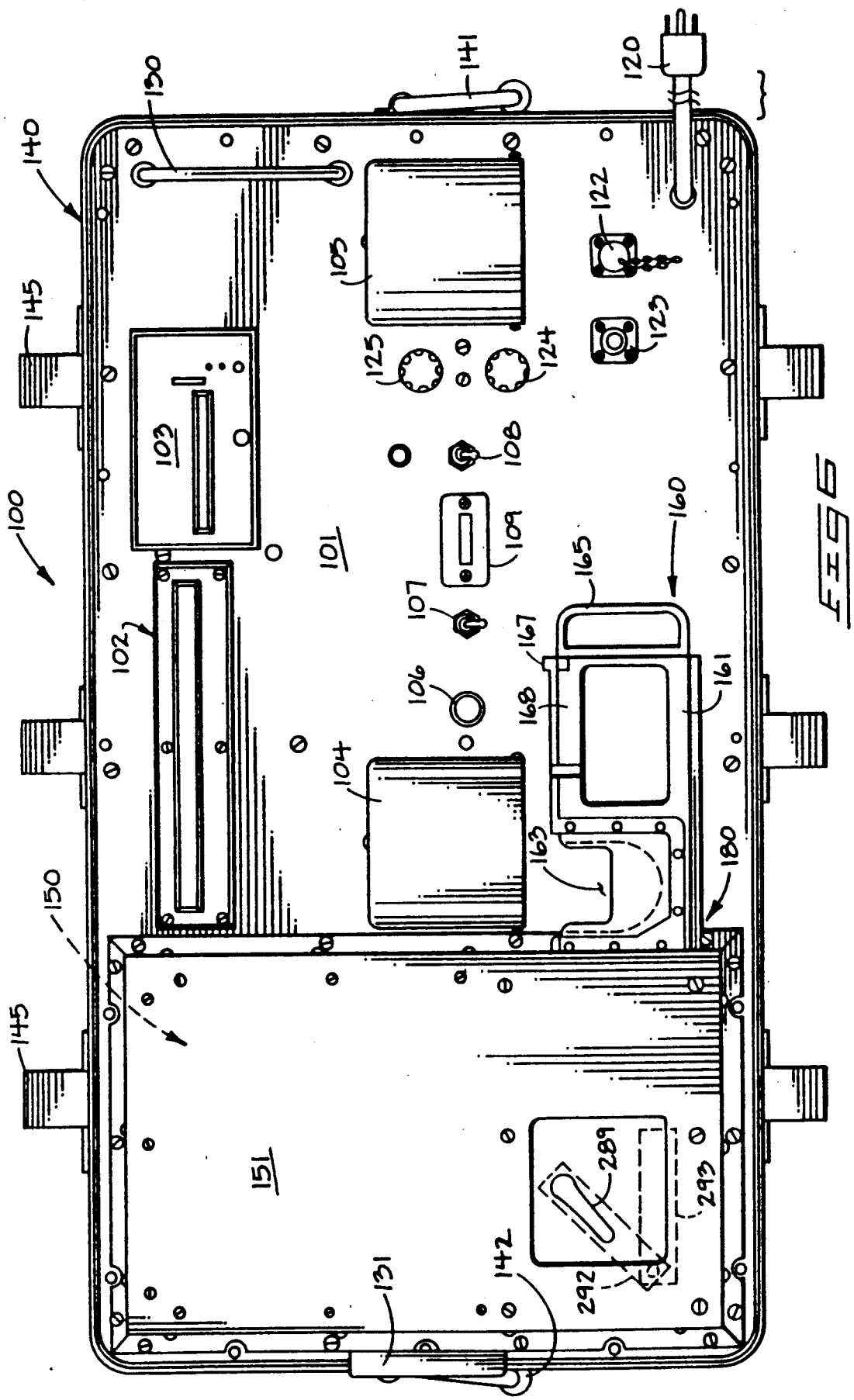
FIG. 6 is a front elevational view of a preferred dosimeter reading apparatus according to this invention.

The following disclosure of the invention is submitted in furtherance with the constitutional purpose of the Patent Laws "to promote the progress of science and useful arts" (Article 1, Section 8).

FIG. 1 shows a portion of a preferred laser dosimeter or phosphor reading apparatus 9 according to this invention. Dosimeter reading apparatus 9 is similar in construction to the phosphor reading apparatuses described in the incorporated by reference U.S. Pat. No. 4,839,518, specifically at pages 8-33 and associated FIGS.

Dosimeter reader 9 includes a laser beam source means 10 which generates a suitable laser beam 16 for use in stimulating the particular type of phosphor or other radiation sensing and storing material used to detect the radiation dose. The laser beam source 10 can be a laser, such as a wave guide or non-wave guide laser of desired stimulating frequency or wavelength. When the dosimeter being read uses a thermoluminescent phosphor a suitable type of laser is preferably an infrared carbon dioxide ($CO_2$) laser having an approximate wavelength of 10 micrometers. Other lasers having beams in the infrared and visible ranges of the electromagnetic spectrum can alternatively be used. When the dosimeter dose storage material or phosphor is of a type suited for optically stimulated luminescent emission then a higher frequency laser, such as a neodymium yttrium aluminum garnet laser (Nd:YAG) laser or dye laser having an approximate wavelength of 1 micrometer is preferably used as laser source 10. Lasers having wavelengths of 0.1-1 micron are alternatively possible, as are other lasers providing beams in the ultraviolet range of the electromagnetic spectrum. Optically stimulated luminescence and the reading of phosphors using optically stimulated luminescence is explained in greater detail in U.S. Pat. No. 4,507,562, entitled "Methods For Rapidly Stimulating Luminescent Phosphors and Recovering Information Therefrom", issued Mar. 26, 1985 which is hereby incorporated into this document by reference in its entirety.

Laser source 10 advantageously includes a laser head 12 having a laser cavity 11, and preferably a laser cooling and temperature stabilization unit 13. Cooling and stabilization unit 13 helps to maintain the laser beam 16 within an acceptable range of frequency or wavelength output. Laser head 12 is powered by an electronic laser power supply 15. Laser head 12 and laser power supply 15 are preferably selected to allow modulation of the laser power output. The preferred modulation is pulse width modulation at radio frequencies as explained in greater detail in the incorporated U.S. patent application Ser. No. 882,953 now U.S. Pat. No. 4,839,518. A suitable laser is Model B48-1-115 from Synrad, Inc., having a modulation frequency of 30 kHz.

The preferred laser source includes suitable means for providing a fixed orientation polarized laser beam 16.

The polarizer or other equivalent polarization means is preferably incorporated into the laser source, but can alternatively be provided in the form of an initial optical polarizing element 118 which is not incorporated into the laser. Fixed polarization is desired because the mirrors and other optical elements typically have some variations in reflectance or other optical properties which vary dependent upon the polarization orientation of the laser beam 16.

The emitted laser beam 16 is advantageously directed using any desired mirror arrangement as the particular arrangement of the dosimeter reader suggests or requires. FIG. 1 shows an arrangement utilizing two mirrors 17 and 30. The mirrors are most preferably gold coated copper mirrors having a flat reflective surface.

FIG. 1 also shows a beam splitter 18 which allows most of the laser beam to continue therethrough, but reflects a detector beam 21. The beam splitter 18 can advantageously be a zinc selenide window having anti-reflection coating on one side. The uncoated face is used to reflect the detector beam 21. The beam splitter is preferably made with non-parallel faces to prevent coincident interfering reflections from being directed to a laser power detector 20 from both faces of the beam splitter.

Detector beam 21 is directed through a beam interrupter, such as a chopping wheel 23 with one or more apertures 24, and then to the laser power detector 20. The chopping wheel or other beam interrupter is needed when the laser power detector performs better with an intermittent detector beam. When laser power detectors are used which can continuously monitor the beam, then no beam interrupter is needed. A preferred type of laser power detector is a pyroelectric detector having a lead zirconate titanate detector element available from Barnes Engineering, Div. of EDO Corporation, Model 350-2. Such a pyroelectric detector is preferably used with a beam interrupter. An alternative arrangement and type of laser power detector is also shown in connection with FIG. 2. and is described below.

The laser power detector produces an electronic output signal which is communicated to a laser power signal enhancer 62 to improve the signal's characteristics. The resulting enhanced signal is communicated to an analog-to-digital (A/D) converter 200 which produces a digital signal representative of the laser power level at particular measurement points in time, dependent upon the output signal of the laser power detector and the frequency rate at which the A/D converter scans it's input signal from the laser power signal enhancer 62.

The digital laser power signal from A/D converter 200 is communicated to a computer or other digital controller 202. The computer preferably stores information indicative of the laser power with time. Computer 202 also processes the digital laser power signal from converter 200 relative to a desired and adjustable laser power level which is programmed into the computer. The comparison of the measured laser power level against the predetermined laser power level target produces a power control output signal which is suitably processed, such as through a digital-to-analog converter 206. Converter 206 provides an analog laser power control signal which is communicated to a modulation circuit 70. Modulation circuit 70 outputs a modulation signal which is communicated to laser power supply 15 in order to control the power of the laser beam 16 output from laser source 10.

The laser power modulation and control system just described allows the instantaneous power level of the laser beam to remain at a desired level. The desired laser power level can remain constant or vary during the heating or other reading or stimulating cycle to best stimulate and extract the dose exposure information.

As shown, laser beam 16 is controlled by an exposure shutter 26 which is downstream from the beam splitter 18. Alternatively, exposure can be controlled by turning the laser source on and off. Any exposure shutter can be of a variety of types, and is preferably provided with an electrically controlled shutter actuator to enable computer 202 to control the shutter and resulting exposure of the dosimeters to the laser beam. The reflected laser beam 16a from the shutter when closed is preferably dissipated in any suitable beam dump 28. The controlled laser beam emitted from the shutter when open is supplied directly to remaining parts of the system or beamed against the second mirror 30 to provide the desired position, orientation and adjustment capability.

FIG. 2 shows additional portions of the preferred dosimeter reading apparatus 9 according to this invention as adapted to carry out the novel methods of the invention. FIG. 2 indicates that the shutter controlled laser beam is preferably passed through a short focal length focusing lens 301 which directs the beam toward an optional aperture means 302. Lens 301 is advantageously constructed of zinc selenide with an anti-reflective coating when transmitting the approximately 10 micron wavelength laser beam used in the thermoluminescent dosimeter reading applications among those contemplated by this invention. Focusing lens 301 preferably converges the beam to a focal point from which the beam diverges toward any aperture means. Aperture means 302 is a non-transmissive plate having preferably one opening or aperture which can be of suitable configuration, such as a circular hole (as shown), circular annular ring (not shown), or other suitable configurations. Aperture means 302 is included to reduce the amount of the laser power and/or to minimize the beam size.

FIG. 3 shows an alternative form of dosimeter reader 9a which is very similar to the embodiment of FIG. 2 with the addition of an optical equalizer means 31 in the form of a reflective optical channel 34. The laser beam is directed into the channel through lens 32 which diverges the beam into the channel. In the channel the beam is reflected and equalized. The beam emitted from the channel is of more uniform laser power density and can be used for dosimeters not requiring very small laser beam focusing.

Referring to either FIG. 2 or FIG. 3, the beam emitted from the aperture 302 or equalizer 31 is preferably directed onto a dosimeter being read, such as dosimeter 330, using a suitable beam imaging subsystem 304. The imaging subsystem can be arranged in various ways. As shown, imaging subsystem 304 includes a first imaging lens 305 which receives the beam emitted from any aperture means 302 or equalizer 31. Lens 305 is preferably selected to receive the diverging beam and refract the beam to provide preferably parallel beam rays. The substantially parallel or other suitable beam from lens 305 is reflected from an imaging mirror 308. The reflected beam from mirror 308 is advantageously passed through a second imaging lens 309 which focuses the beam for appropriate beam size as the beam impinges on the dosimeter 330.

The dosimeter reader can also be adapted to accommodate a laser power detector 320 and related components near the beam imaging subsystem. Such laser power detector functions in substitution to laser power detector 20 or in addition thereto to provide increased potential for accurate laser power control. Laser power detector 320 receives and measures the intensity of a partially reflected detector beam 16b which is split from the main laser beam by beam splitter 318. Beam splitter 318 is similar to beam splitter 18 described above. Laser power detector 320 is shown as a laser power detector which can continuously monitor without the need for a beam interrupter, such as chopping wheel 23. A suitable type of continuous laser power detector is a photoconductor, such as a mercury cadmium telluride photoconductor. A suitable commercially available model is made by ElectroOptical Systems, Inc., Model MCT10TE1. Other suitable photoconductors may also be appropriate for use in dosimeter reading apparatus made in accordance with this invention.

FIGS. 2 and 3 show that dosimeter readers 9 and 9a also preferably include an emission detection subsystem 350. Emission detection subsystem 350 preferably includes an emission collection means such as reflective emission collector and conduit 351 which is adjacent the dosimeter 330. Although FIGS. 2 and 3 show the dosimeter spaced downwardly for diagrammatic ease of illustration, in preferred arrangements the dosimeter will be positioned close to the collector 351 to increase the sensitivity of the dosimeter reader. Emission collector 351 includes or is immediately adjacent to a specimen opening 352 which allows the stimulating beam to pass to the dosimeter, and allows the emitted energy from the dosimeter to be concentrated and conveyed to a suitable emission detector 355. The emission collector 351 is preferably reflectively coated along interior surfaces, and advantageously formed as a semi-cylindrical conduit with the curved side upward as shown in FIG. 2. The area below the beam splitter 318 is advantageously formed as an ellipsoidal reflector which directs the reflected luminescent emission from the dosimeter longitudinally along the semi-cylindrical collector 351 toward emission detector 355.

Emission detector 355 is advantageously a photomultiplier tube which provides an output signal indicative of the luminescent emission made by dosimeter 330 with time. A variety of suitable photomultipliers are potentially of use in dosimeter readers according to this invention. Other alternative detectors can also be used as needed for the particular type of dosimeter or other radiation sampling device which is being stimulated to emit energy indicative of the level of radiation exposure experienced.

The output from the photomultiplier or other emission detector is preferably output to an emission signal processing and memory unit 52 which can provide signal amplification, digitization, visual display, and/or transformation into a suitable form of permanent data storage. It is desirable that the output signal with time be carefully recorded in the preferred dosimeter reading apparatus according to this invention. Many, if not all, of the functions of unit 52 can be performed on either a discrete processor unit or using suitable programming and computer 202. If discretely processed the output from unit 52 is communicated to computer 202 for processing or vice versa to allow integration of the stimulation and emission information.

FIGS. 2 and 3 also show that dosimeter reading apparatus 9 and 9a preferably includes a suitable dosimeter holding and positioning means 370. Dosimeter positioner 370 is advantageously an X—Y positioning device constructed to allow automated control of the X and Y positioning coordinates. Positioner 370 includes two Y direction slide bars 372 which allow the Y positioning stage 374 to move back and forth in the Y direction. A suitable Y direction drive is included such as the Y drive 375. Y drive 375 includes a threaded receptacle 376 on the Y positioning stage. A lead screw 377 is threadably received in the receptacle 376. A lead screw motor 378 is mounted to the frame 371 and is used to turn the lead screw thus causing the Y stage to slide on the slide bars 372. Motor 378 is preferably a highly accurate stepper motor. Optionally, an encoder can be incorporated into the motor and used to detect the motor position and produce a feedback position signal indicating the position of the stage.

Dosimeter positioner 370 similarly includes an X positioning stage 380. X positioning stage 380 is slidably mounted on two X direction slide bars 382 which are secured to the Y stage 374 in a manner allowing the motion of X stage 380. The X stage 380 also preferably includes a threaded receptacle 386 which receives an X lead screw 387. A further stepper motor 388 turns lead screw 387 thus driving the X stage in the same manner as the Y stage, except in an orthogonal direction.

The X stage can also advantageously be provided with one or more dosimeter or other sample holding devices 390 to secure the dosimeter in position. The dosimeter positioning means 370 functions as a holder for the dosimeter 330, and is further adapted to include the lateral restraints or holders 390. The lateral dosimeter holders engage the dosimeter applying downward force in a spring clip arrangement which serves to restrain the dosimeter against inadvertent dislodgment. A variety of means for holding the dosimeters are possible, including application of a vacuum to the lower surfaces of the dosimeter through holes in the X stage (not shown).

The dosimeter positioning arrangement and construction allows the dosimeter 330 to be moved relative to the focused laser beam point 16d to heat, optically stimulate, or otherwise stimulate the dosimeter phosphor or other suitable dose storage material. The drive motors 378 and 388 are preferably controlled by computer 202 so that automated movement of the dosimeter positioning device can be accomplished. This allows effective scanning of the dosimeter by the stimulating beam and other types of relative positioning to be accomplished in order to practice the novel methods of this invention as explained more fully hereinafter.

FIGS. 4 and 5 diagrammatically show a preferred laser beam converter apparatus 400 adapted for use in a radiation dosimeter badge reading application. Laser beam converter 400 is positioned adjacent to the X—Y positioner and dosimeter holder 370 described above and similar reference numerals are used. The laser converter 400 includes a frame 451. The frame mounts a converter block 402 using a shaft 403. The converter block is connected to a converter block drive gear 404. Converter block drive gear 404 is turned through a limited arc of approximately 180° by a stepper motor 407 using output pinion gear 408 which meshes with the drive gear.

The optical laser converter 400 defines two different optical pathways for the incoming laser beam 16. The first optical path 410 is shown aligned to receive and transmit the incoming laser beam 16 in FIG. 4. The second optical pathway 420 is shown aligned to receive and transmit the incoming laser beam 16 in FIG. 5. Both optical pathways 410 and 420 are defined by passageways formed through the converter block 402.

The first optical pathway 410 includes a lens 432 which is similar to lens 32 described hereinabove. Lens 432 disperse the incoming laser beam 16 into a reflectively lined optical equalizer channel 431a formed in an optical equalizer insert 431. The optical equalizer 431 is mounted within the first passageway 411 formed in the converter block 402. A spacer tube 412 is used to hold the lens 432 in position against a shoulder 413 formed along the incoming face of the converter block adjacent to the first passageway incoming opening 414. The equalized laser beam emits from the emission end of the optical equalizer, which is the left end as shown in FIG. 4. The equalized output laser beam passes through an outlet passage 418 formed in the gear 404. The output beam then advantageously enters an imaging block section 460 which is preferably used in the optical laser converter 400.

FIG. 5 shows the converter block rotated 180° relative to FIG. 4, thus bringing the second optical pathway 420 into alignment with the incoming laser beam 16. The second optical pathway is arranged through a second passageway 421 formed through the converter block 402. The incoming laser beam 16 is first passed through a beam splitting mirror 422 which partially reflects a secondary laser beam 423 downwardly and into a cavity 424 which serves as a beam dump to dissipate the energy of the secondary laser beam. The beam splitter 422 serves to reduce the amount of power contained in the laser beam which is output from the second optical pathway 420.

The reduced power laser beam transmitted through the beam splitter 422 is passed to a lens 425 which serves as an initial element in the imaging of the laser beam when it is transmitted through the second optical pathway 420. This second pathway converter lens 425 is held in position by a mounting tube 435. Second pathway converter lens 425 also serves in conjunction with an aperture to a power reduction capacity by focusing and dispersing the beam which it outputs for diminution by the aperture. The output beam from the second optical pathway is passed through or about power reducing aperture 426 which is advantageously mounted as near the imaging lens 461 as practicable, such as at the emission side of the passageway 427 formed through the gear 404. FIG. 5A shows that the power reducing aperture 426 can advantageously be formed by positioning a small circular occlusive element 428 within the passage 427, such as by using small circular holder 426a which mounts supporting wires 429 which suspend the occlusive element 428. This aperture construction reduces the laser beam power further by occluding the center, most power portion of the laser beam. It works in addition to the power reduction by the beam splitter 422, and is independent with respect thereto.

The optical laser converter 400 also advantageously includes the imaging block 460 which appropriately directs and images the laser beams output from the converter block first and second optical pathways 410 and 420. The imaging system included in imaging block 460 advantageously includes a first imaging block lens 461 which receives the diverging first and second output laser beams from the first and second optical pathways. The first imaging block lens 461 renders the enlarged output laser beams into parallel ray beam formations. The parallel ray beams are then reflected from the front inside surface of a surface coated mirror 463. Mirror 463 is held in position by a retainer 464 which is fastened to the frame structure 451 using fasteners (not shown). The reflected beam from imaging mirror 463 is directed to a second imaging lens 467 which focuses the first or second output laser beams onto the dosimeter 330.

As FIG. 4 indicates the first stimulating beam output after passage of the laser beam through the first optical pathway produces a relatively larger heating beam. The optical equalizing channel 431a is preferably square in cross-section thus producing an imaged stimulating beam which is about 2–4 millimeters along each side and substantially square as shown on the dosimeter 330. This beam can be used to heat dosimeters to cause thermoluminescent or other emissions to occur as is well-known in the art. The large beam can also be used to laser anneal dosimeters by providing a relatively uniform, equalized, laser beam. The power level of the stimulating beam can also be adjusted as explained hereinabove to a desired laser power level, which in the case of annealing operations can be relatively low power.

FIG. 5 indicates that the second stimulating beam output after passage of the laser beam through the second optical pathway produces a very small highly focused beam which is preferably less than 100 microns is diameter. The stimulating beam is preferably approximately 3–10 wavelengths of the infrared laser beam in diameter, approximately 30–100 microns in diameter. This very small stimulating laser beam can thus be used to heat very small, localized regions of a dosimeter to perform radiation dosimetry by counting differentially ionized sample areas from heavy charged particle events as explained in the co-pending incorporated by reference parent application, Ser. No. 336,015.

FIGS. 4 and 5 further show an output beam splitter 478 which produces a secondary output beam directed at an output beam detector 479. Dectector 479 can be similar to laser power detector 20 described hereinabove, or an alternative detector for alternative purposes. The use of an output beam detector allows more accurate monitoring of the actual laser beam power used to stimulate the dosimeters.

FIG. 6 shows a preferred form of dosimeter reading apparatus 100 according to this invention. Dosimeter reading apparatus 100 includes a front panel 101 which includes a digital display 102 and printer 103. The display 102 displays operational commands and dose exposure information. The printer can print dose exposure information. Two ventilation covers 104 and 105 are shown covering an exhaust vent and fan intake, respectively. A dosimeter read cycle activation switch 106 is pushed to start the reading cycle. A printer control switch 107 is used to control operation of an auxiliary, external printer or plotter 402 (FIG. 16) which can be used to print the dose information displayed by display 102 and luminescent glow curves measured in producing the dose information. A power on-off switch 108 is also mounted on the front panel, as is an hour meter 109 which indicates total operational time.

Figure 16:
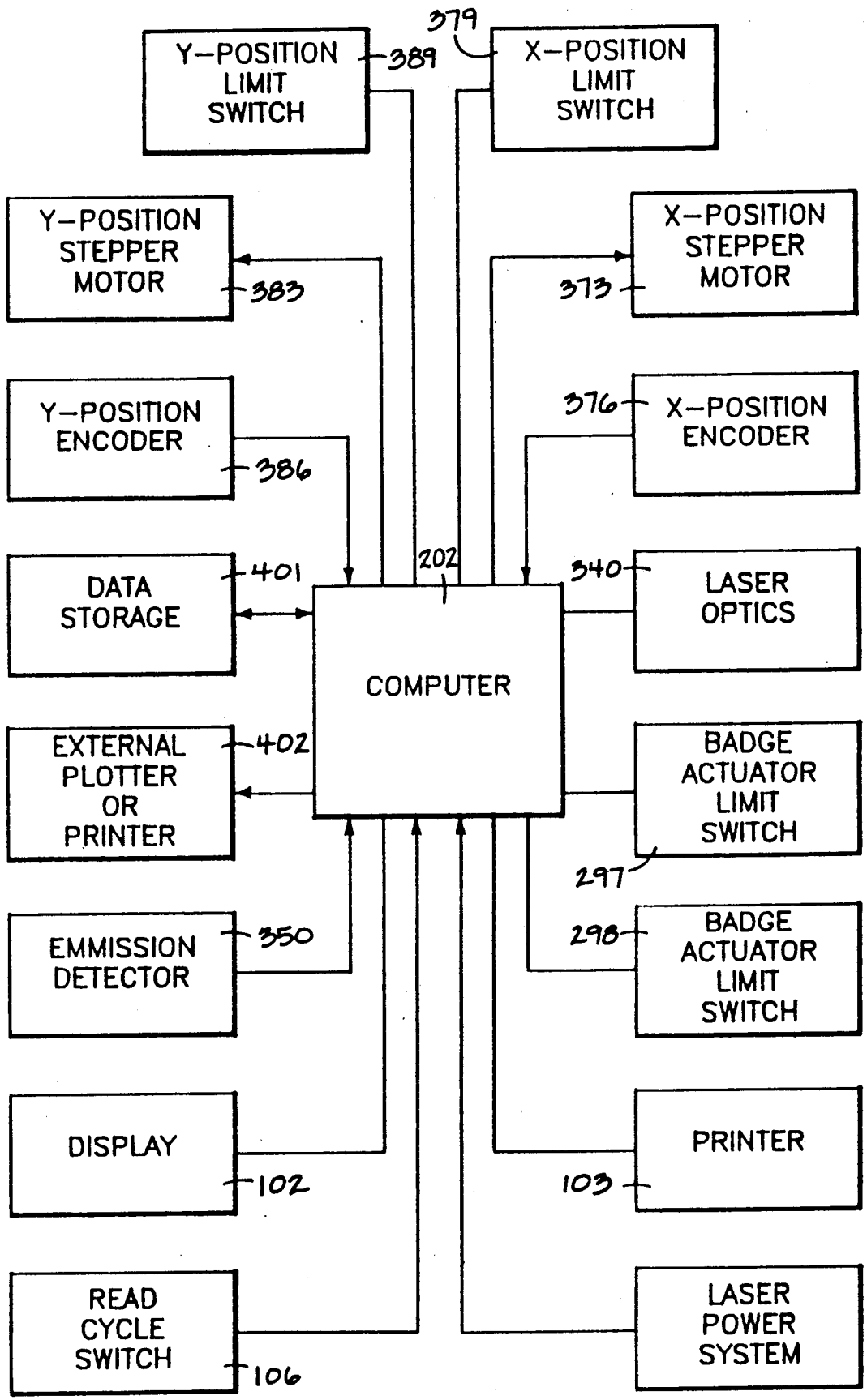
FIG. 16 is a block diagram of the control system used in the dosimeter reader of FIG. 6.

The front panel also mounts a power cord 120 for providing 120volt a-c power to the reader. An electrical connector 122 includes electrical conductors which are appropriately connected to key signal and circuit components for use in diagnosing electrical system problems which might develop in the reader. The electrical connector also serves as an electronic signal port for connecting an external computer to the reader for programming the reader and to advantageously serve as an external data storage 401 (FIG. 16), either in addition to or in substitution of data storage mounted on the reader 100. A signal output connector 123 is provided to transmit glow curve and dose information signals to the auxiliary printer or plotter 402 (FIG. 16). A fuse receptacle 124 and spare fuse receptacle 125 are also shown.

Handles 130 and 131 are mounted to the front panel to aid in disassembly of the unit. The reading apparatus is advantageously provided with a rugged fiberglass and nickel shielded case 140. Case 140 mounts carrying handles 141 and 142. The case also includes six (6) heavy duty over-center luggage type fasteners 145 which clip over and hold a case cover (not shown) which covers the front panel 101.

The left part of the dosimeter reader as shown in FIG. 6 includes a dosimeter badge reading compartment 150 which is covered by a reading compartment front panel 151 which can be removed. The reading compartment front panel is normally installed and forms a cover over the light and dust tight reading compartment 150. The reading compartment is shown with cover 151 removed in FIG. 9, which will be described in greater detail below.

Figure 7:
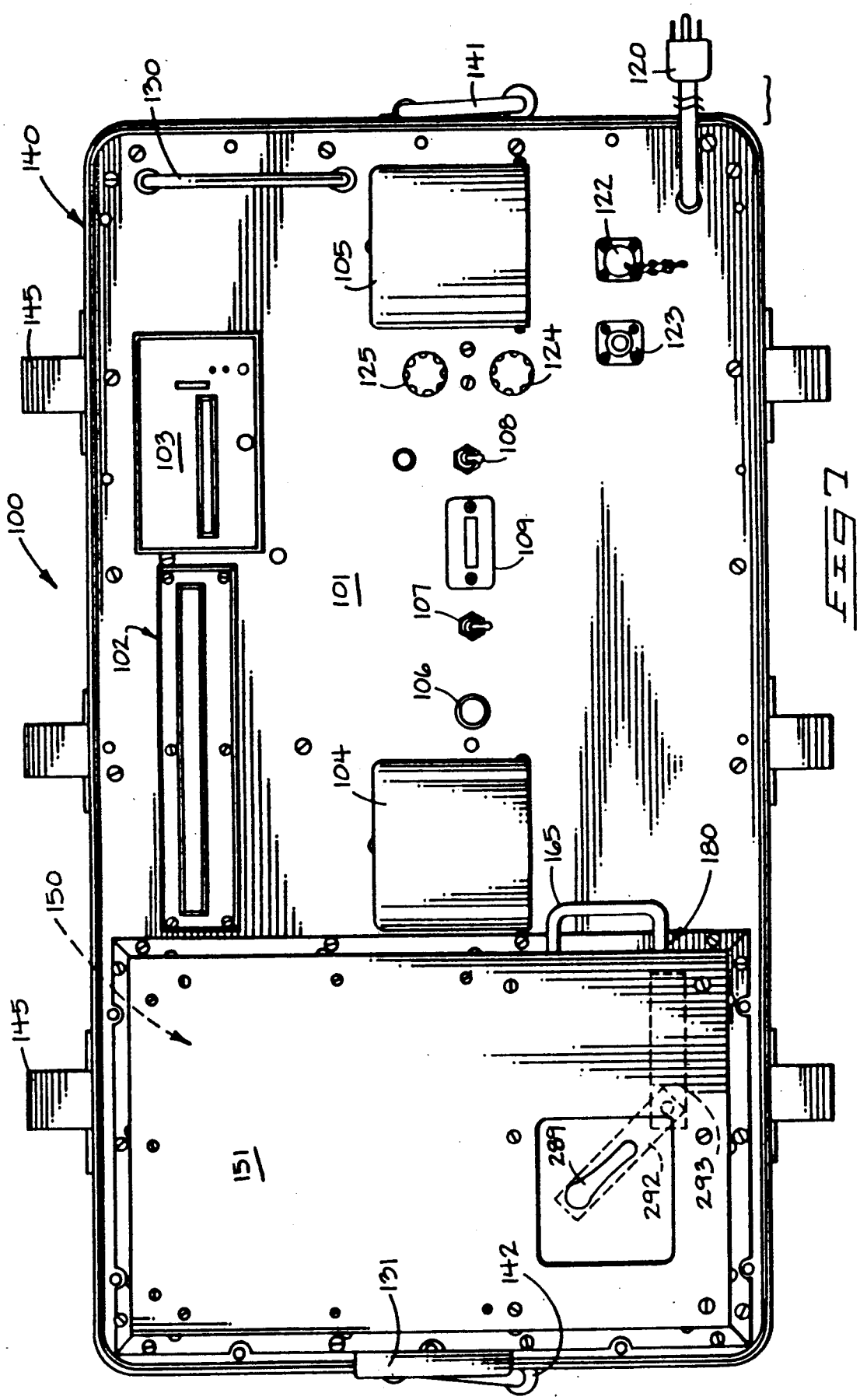
FIG. 7 is a further front elevational view similar to FIG. 7 with the dosimeter badge feed mechanism in a closed position.

FIGS. 6 and 7 show that the dosimeter reader includes a dosimeter infeed mechanism 160. The dosimeter badge infeed mechanism 160 is advantageously provided in the form of a sliding dosimeter badge holder 161. The sliding dosimeter badge holder 161 includes a slide framework 168. The slide framework is mounted by slide tracks 162 (FIG. 8) which are mounted on the inside of the cover 151 in a well-known fashion to form a slideway 181. The sliding dosimeter holder further includes a dosimeter badge receptacle 163 which is mounted on the slide framework 168. The dosimeter badge receptacle is shaped to receive an irregularly shaped dosimeter badge (not shown) in a unique manner so that the badge can only be fully accepted into the receptacle 163 when the badge is properly oriented.

The sliding dosimeter badge holder further advantageously includes a handle 165. The handle 165 is integral or rigidly connected with slide framework 168. Adjacent to the handle is a flange 167 which acts as a stop when the slide is fully inserted and further serves as a dust and light seal which covers the slide receiving opening 180.

FIGS. 6 and 7 further show a dosimeter badge opening and closing actuator 289. In FIG. 6 the actuator is in the badge closed position awaiting insertion of a badge. In FIG. 7 the actuator lever has been rotated counterclockwise. The lever 289 is connected through the front panel 151 to an interior first link 292. The first link 292 is connected to a slide bar 293 which slides as a result of the pivotal action of link 292. The slide bar is mechanically coupled with a dosimeter badge assembly, disassembly and positioning chuck 200, shown in phantom in FIGS. 12 and 15.

Figure 8:
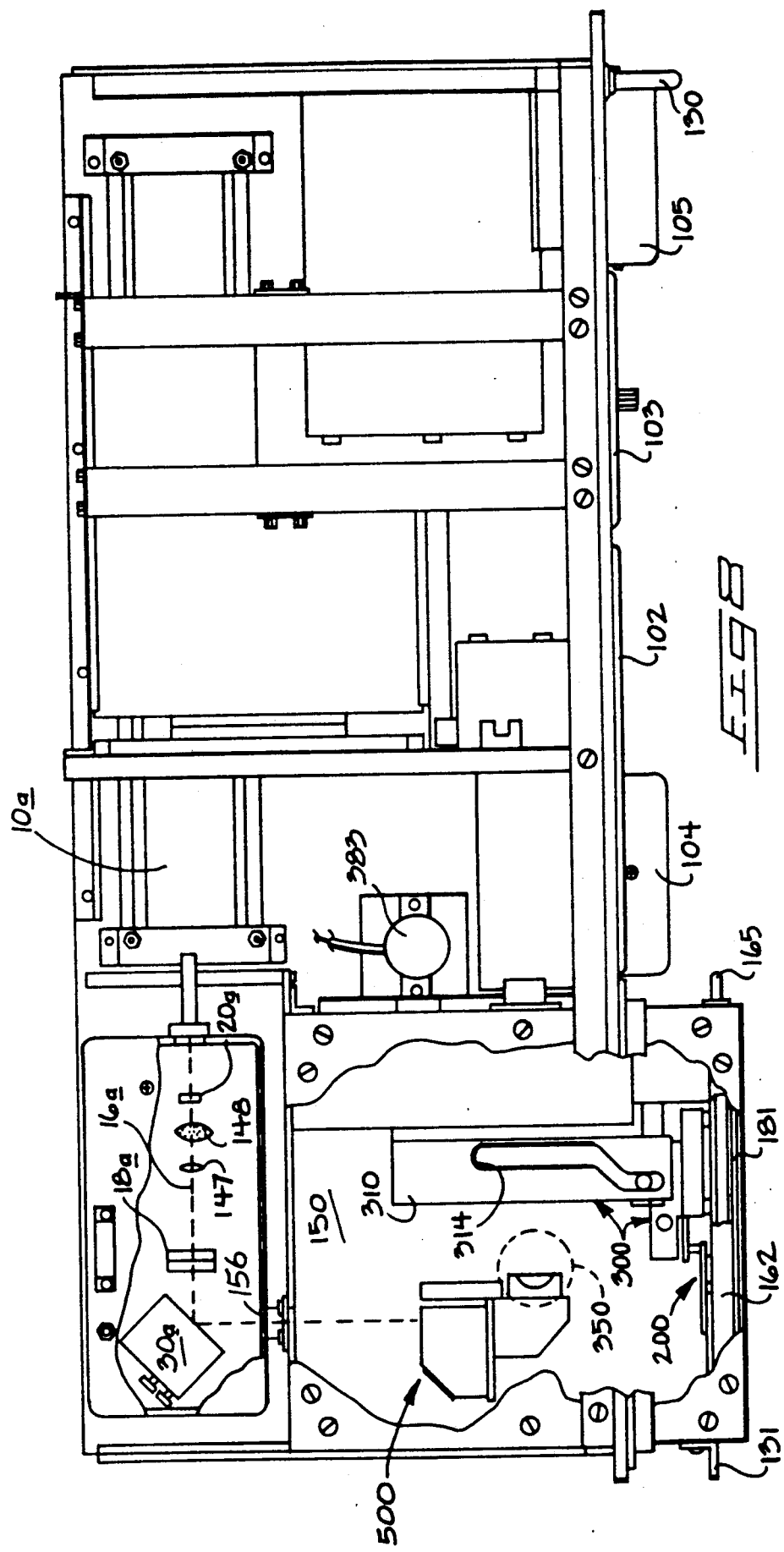
FIG. 8 is a top view showing the dosimeter reading apparatus of FIG. 6. Portions have been broken away and removed to show the basic optical path of the laser beam and related components.
Figure 11:
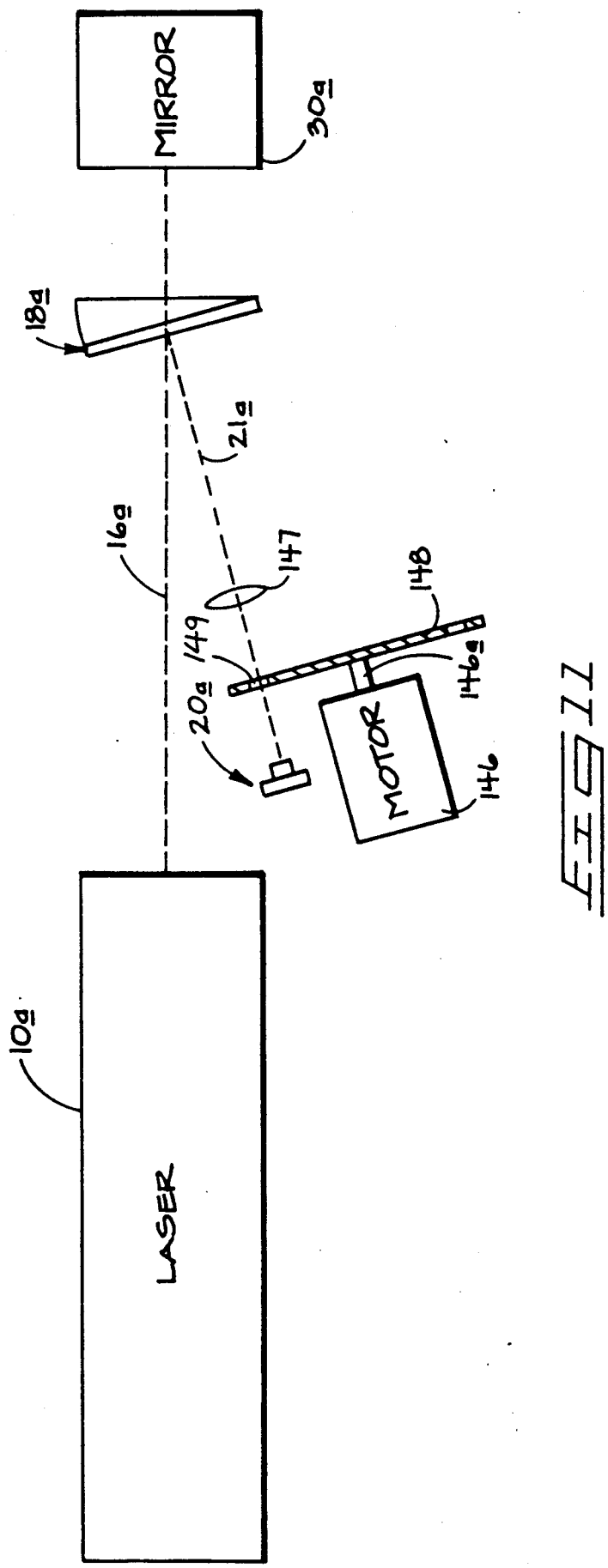
FIG. 11 is a enlarged partial diagrammatic view simulating a rear elevational view showing limited portions of the dosimeter reader of FIG. 6 illustrating the laser beam path immediately from the laser.

FIG. 8 shows a top view of the dosimeter badge reader 100 with the case removed and portions broken away. In particular the light and dust tight reading compartment 150 is shown opened at the left of the machine. FIG. 8 shows a laser 10a which emits a laser beam 16a. The laser beam 16a is partially reflected from a beam splitter 18a. FIG. 11 shows in elevational view that the beam splitter 18a directs the detector laser beam 21a downwardly at angle through a detector beam focusing lens 147 which focuses the beam at the plane of the chopping wheel 148. The detector beam is then intermittently passed by the rotating chopping wheel 148 having a plurality of apertures 149. The chopping wheel 148 is turned by a motor 146 via shaft 146a. The intermittent passage of the detector beam impinges upon the laser power detector 20a, such as described above. The detector 20a provides a laser power signal which is used to provide control of the laser power at desired, potentially time variable, power levels.

Figure 12:
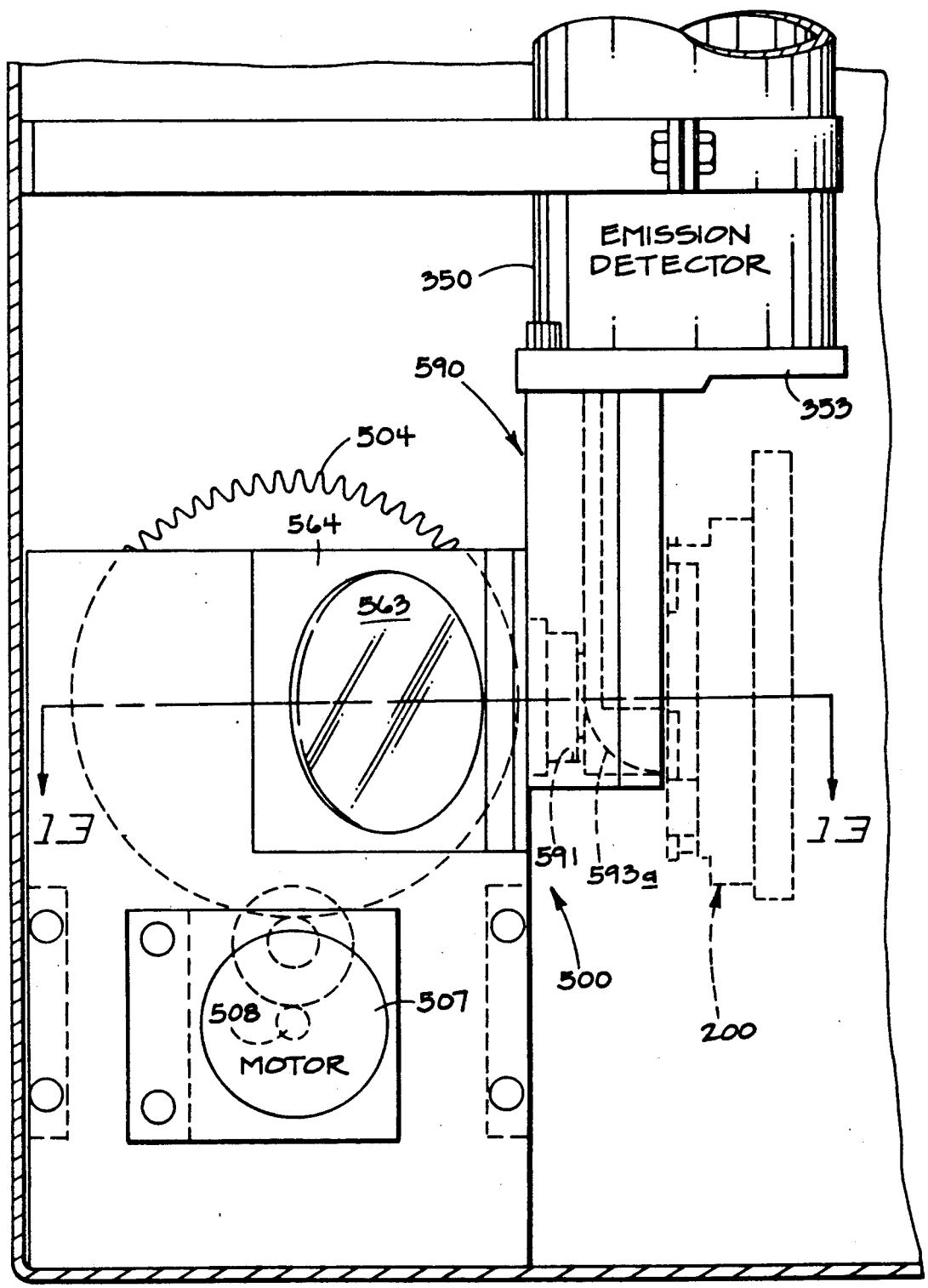
FIG. 12 is an enlarged partial front elevational view showing the optical laser converter and related equipment of the dosimeter reader of FIG. 6.
Figure 15:
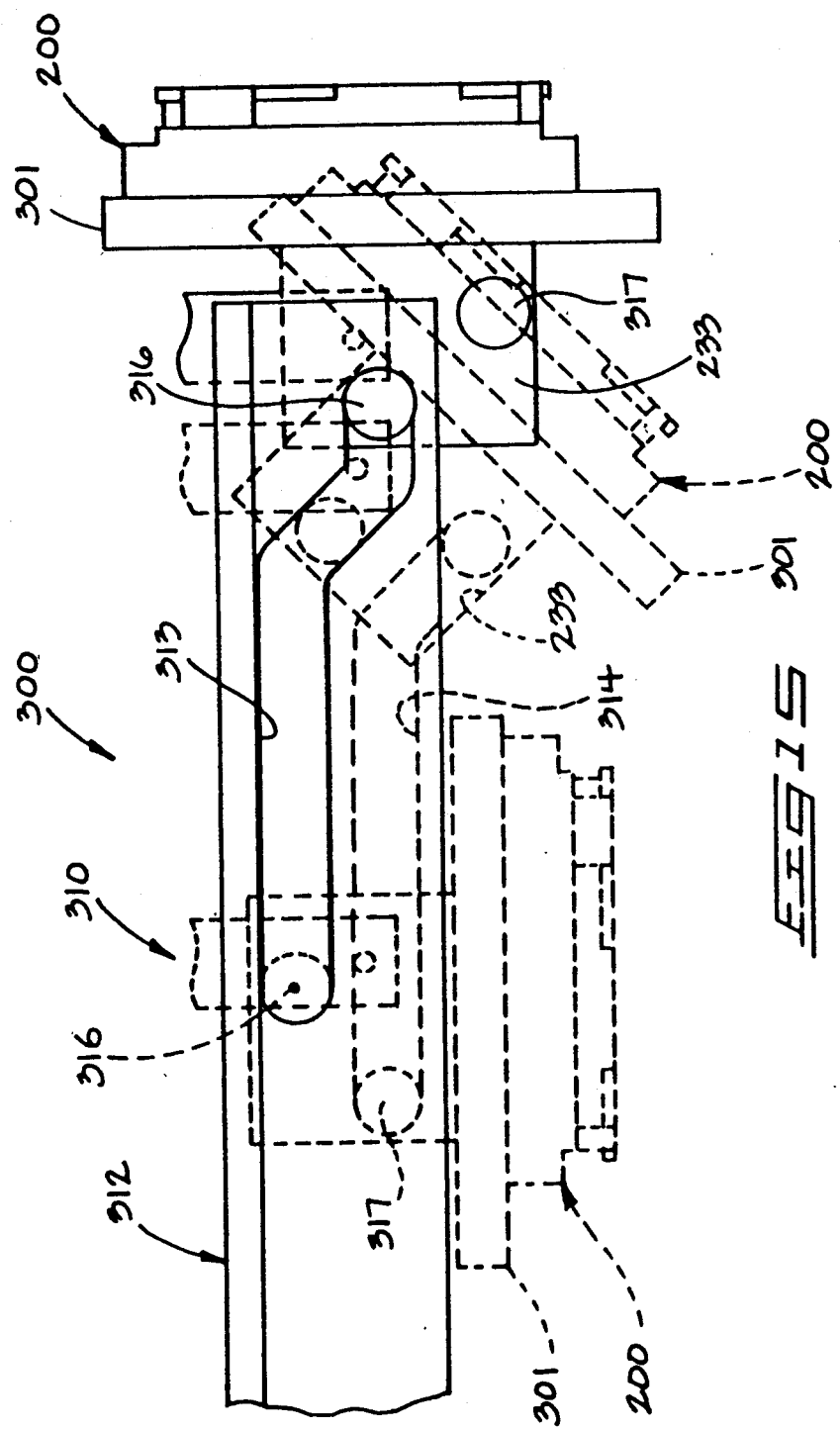
FIG. 15 is a dosimeter badge holding and positioning head advantageously used in the dosimeter reader of FIG. 6.

The portion of laser beam 16a which passes through the beam splitter 18a is redirected by a mirror 30a which is advantageously adjustable. The reflected laser beam from mirror 30a is directed through an anti-reflective coated germanium window 156. The window transmits the laser beam and blocks visible light from entering the reading compartment 150. The laser beam is received by an optical laser converter 500 which is similar in construction to laser converter 400 described above in connection with FIGS. 4 and 5. The laser converter directs the output stimulating beams in a rightward direction as shown in FIG. 8 to the dosimeter badge holding chuck assembly 200. As shown in FIG. 8, the chuck assembly 200 is positioned to engage a newly loaded dosimeter in the slide dosimeter infeed loader 160. FIG. 15 shows the movement of the chuck which places the dosimeters in position for reading as shown in FIG. 12 in phantom. Additional description of the chuck head positioning mechanism will be made below with reference to FIGS. 9, 10, and 15.

Figure 13:
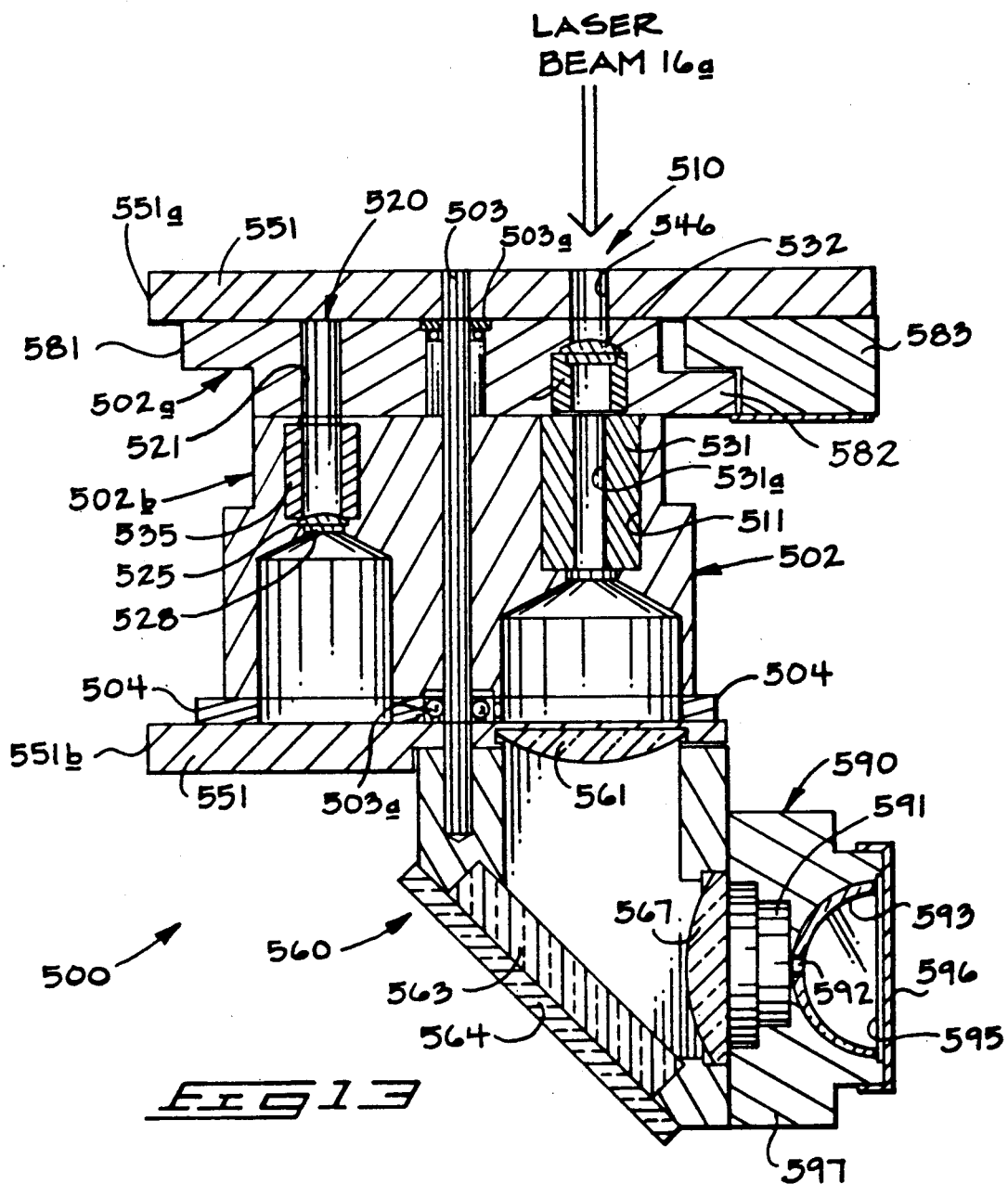
FIG. 13 is a sectional view taken along line 13—13 of FIG. 12.
Figure 14:
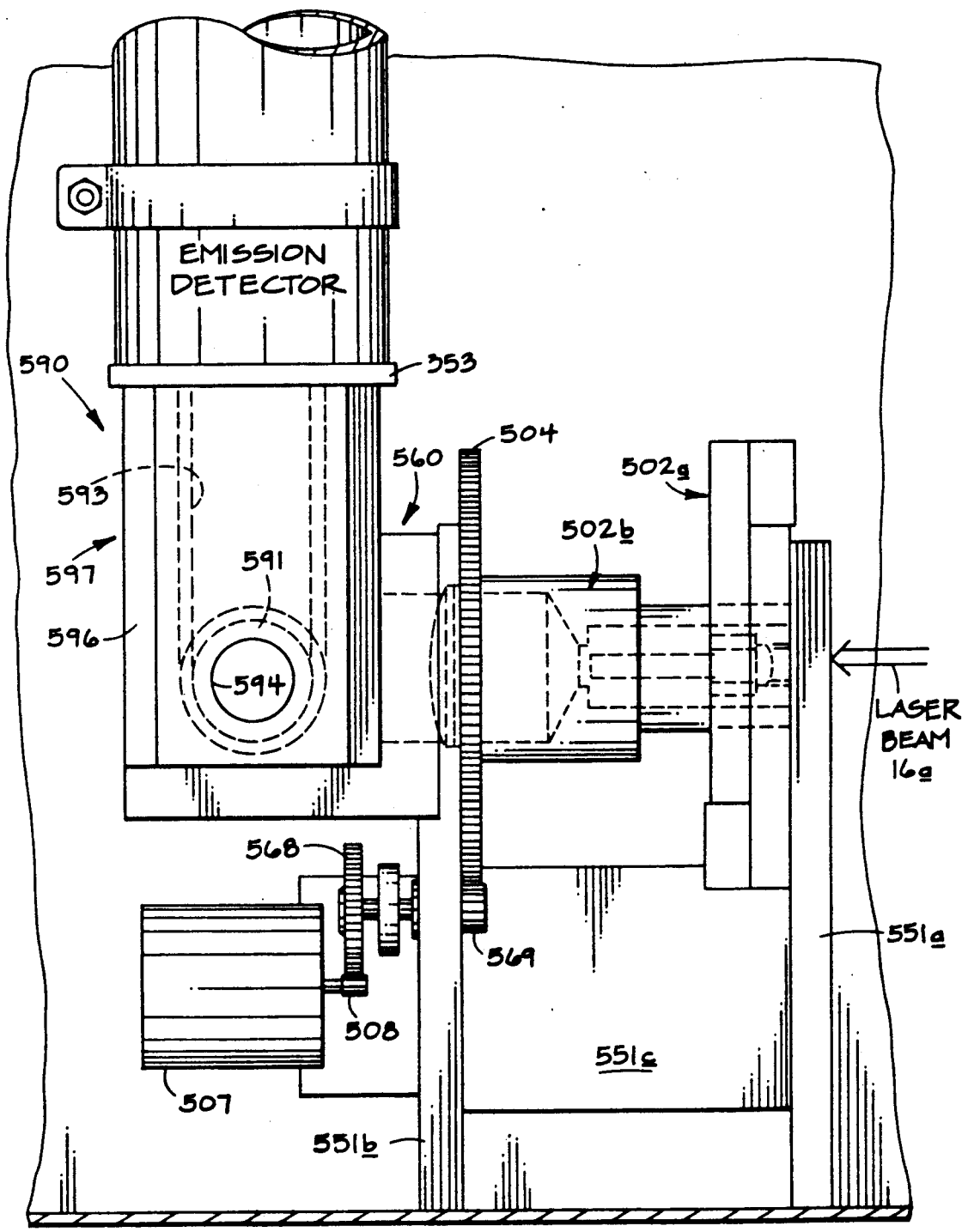
FIG. 14 is an isolated right side elevational view of the optical laser converter shown in FIG. 12.

FIGS. 12–14 show a further preferred optical laser converter 500 according to this invention. Laser converter 500 includes a frame 551 having spaced apart upright frame members 551a and 551b. Frame side panels 551c extend between the upright frame members along both sides. The frame 551 supports a converter block assembly 502 which is advantageously made in two parts 502a and 502b. The converter block assembly 502 is mounted for limited, approximately 180°, arcuate travel upon the converter block assembly mounting shaft 503 using bearings 503a.

The converter block assembly 502 is rotated back and forth using a stepper motor 507 which drives the assembly through a double reduction gear set consisting of first pinion gear 508, idler gear 568, second idler pinion 569 and main converter gear 504. The secondary part of the converter block 502a is provided with limit switch activation extensions 581 and 582 which engage a limit switch assembly 583 having two limit switches to thus control the automatic back and forth operation controlled by computer 202.

FIG. 13 shows the converter block assembly aligned with the first optical pathway 510 positioned to receive the incoming laser beam 16a through an inlet opening 546 formed through frame member 551a. The incoming beam is passed through a first lens 532 which disperses the incoming laser beam into an optical equalizer 531 having reflective channel walls 531a. The lens is held in position using a mounting tube 567 held within the first passageway 511 formed through the converter block 502. The emission end of the optical equalizer 531 is toward a first imaging lens 561 forming a part of the imaging block assembly 560 described below.

The second optical pathway 520 is through a second passageway 521 formed through the converter block assembly 502. When the converter block is driven via gear 504 into a position wherein the passage 521 aligns with opening 546, then the incoming laser beam 16a will pass through the second optical pathway 520. The second optical pathway includes a lens 525 held in position by a tube mount 535 and a shoulder formed on the walls of passageway 521. The second optical pathway lens 525 disperses the incoming laser beam on to the first imaging lens 561. An aperture assembly 528 similar to aperture assembly 428 shown in FIG. 5A is included to reduce the power of the output laser emitted by the second optical pathway when it is positioned to transmit the beam.

The imaging subassembly 560 is similar to imaging subassembly 460 described hereinabove. It includes a surface mirror 563 which is mounted using a mounting piece 564. The output laser beams transmitted by imaging lens 561 are refracted to form generally more parallel rays which reflect from the mirror surface as explained in connection with FIGS. 4 and 5. The reflected partially imaged output laser beams are directed through the second imaging lens 567 which focuses the output beams as they pass through an emission collection assembly 590.

The light collection assembly 590 includes a laser beam passageway 591 which communicates the first and second stimulating output laser beams from the imaging assembly through an opening 592 formed in an emission collection reflector 593. The stimulating laser beams then pass through a dosimeter exposure opening 594 shown most clearly in FIG. 14. The opening is adjacent to the dosimeters held by the dosimeter badge chuck 200 (see in FIG. 12). The opening 594 is formed through both an interior mirror element 595 and a supporting cover piece 596. The cover piece 596 mounts the mirror element 595 and reflector 593 to the light collection assembly base member 597.

The emission collection reflector 593 is preferably made with a lower end which is ellipsoidal near the lower end adjacent to the opening 594. The ellipsoidal end 593a (see FIG. 12) reflects the visible light or other luminescent emission upwardly along the reflector as viewed in FIGS. 12 and 14. The emission is thus directed to the emission detector 350 which is advantageously a photomultiplier tube. A filter 353 is advantageously included between the end of the light collecting reflector 593 and the detector 350 to filter out wavelengths of light longer or different than the desired emission spectrum being measured. The emission collection chamber formed within the reflector is advantageously purged with compressed air to help exclude dust and smoke.

Figure 9:
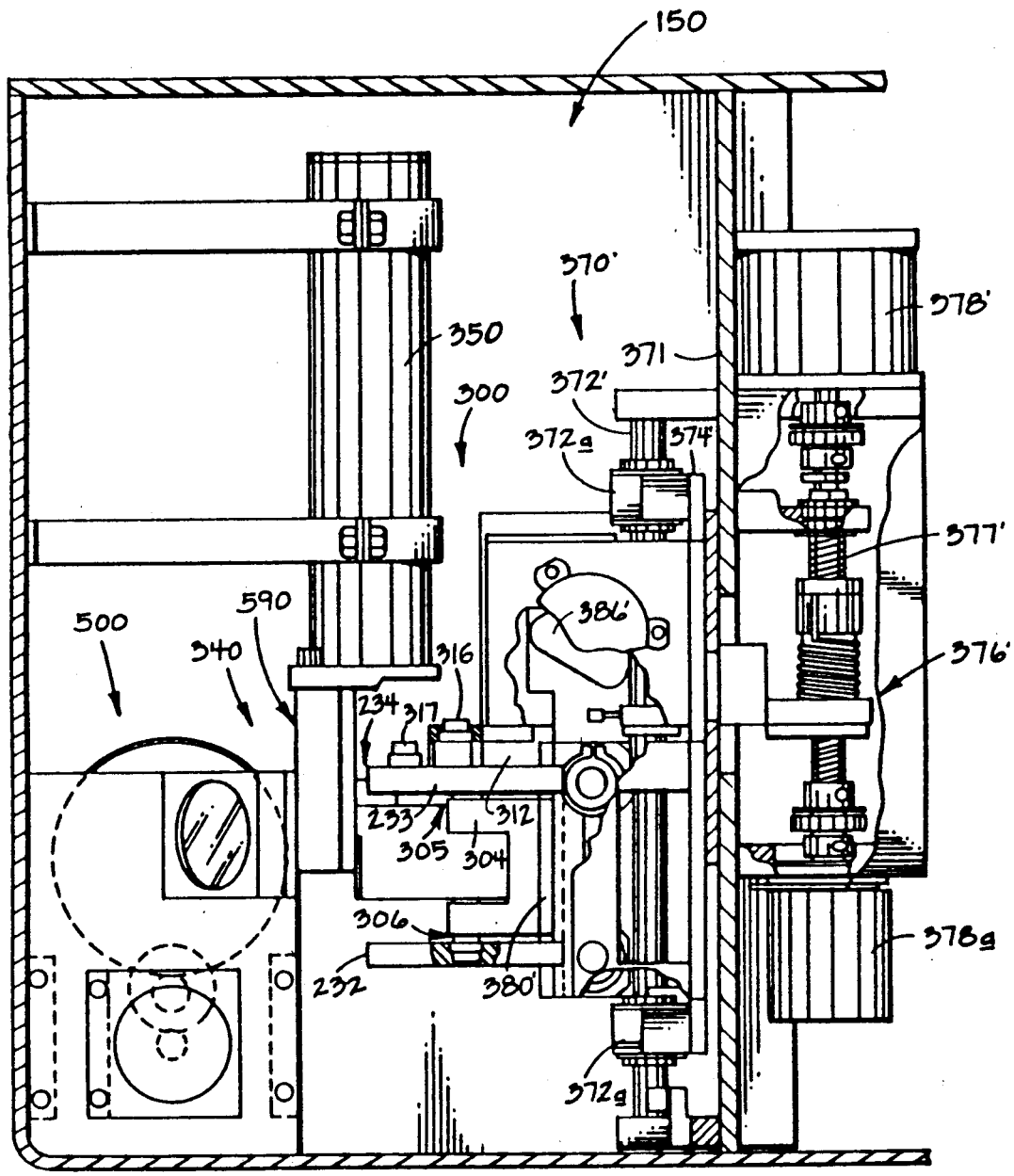
FIG. 9 is an enlarged partial front elevational view with the cover removed showing internal components of an enclosed reading compartment included in the dosimeter badge reader of FIG. 6.
Figure 10:
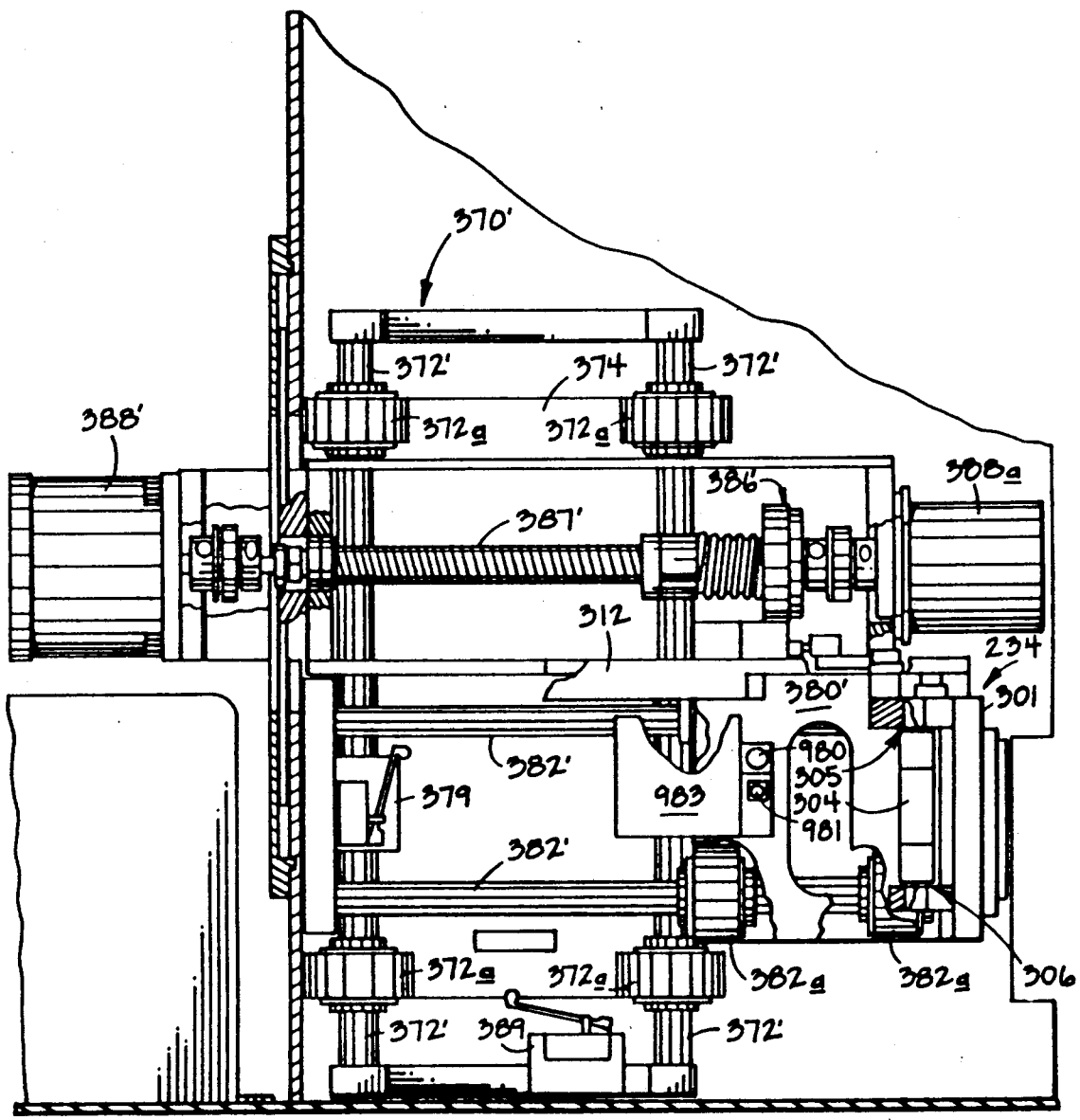
FIG. 10 is an internal elevational view showing a dosimeter badge holding and positioning mechanism used in the dosimeter reader of FIG. 6.

A variety of chuck assemblies or other dosimeter holding and positioning mechanisms can be used in the dosimeter badge reading apparatus made in accordance with this invention. Rotatable tables with extendible chuck mounting heads (not shown), or a large variety of translational stage chuck positioners can be used. FIGS. 9, 10 and 15 show one suitable form of chuck positioner 300 used in the reading apparatus 100. The chuck positioner 300 includes a carrier plate 301 to which the chuck assembly 200 is mounted securely, such as by securing fasteners (not shown) through mounting holes in the chuck assembly 200. The carrier plate 301 is mounted to upper and lower mounting plates 232 and 233 which are pivotally mounted to a U-shaped piece 304 using upper and lower bearings 305 and 306. The carrier plate 301 and mounting plates 232 and 233 form a chuck mounting head 234 pivotally mounted on the U-shaped bracket. The U-shaped bracket is supported on the X stage frame piece 380' which slides along X stage slide rods 382' with adjustment of the X—Y positioner 370'. The X stage piece 380' moves the chuck mounting head along a path which retracts the chuck from the dosimeter engaged position shown in solid line in FIG. 15 and moves it rearwardly, as indicated by the intermediate position and fully retracted reading position, both shown in FIG. 15 in phantom lines.

The chuck positioner 300 further advantageously includes a translational stage camming mechanism 310 which includes a track assembly 312 having a first guide track 313 and a second guide track 314 shown in FIG. 15. The upper mounting plate of the chuck head assembly mounts a set of follower bearings 316 and 317 which extend upwardly and are received within the tracks 313 and 314, respectively, as the X positioner stage retracts the chuck head rearwardly relative to the track assembly 312 which is mounted in a fixed position relative to X-stage motion. This arrangement causes the chuck assembly mounting head 234 to pivot and reorient the dosimeter badge chuck assembly 200 into dosimeter badge reading position shown at the left in FIG. 15, which is at approximately a right angle to the orientation of the chuck mounting head when extended into the dosimeter badge engaging position shown in solid line at the right in FIG. 15.

The X—Y positioner 370' is shown most clearly in FIGS. 9 and 10. It includes vertical guide rods 372' and horizontal guide rods 382'. The vertical Y stage guide rods 372' mount linear bearings 372a and the horizontal X stage guide rods mount linear bearing 382a. The horizontal motion of the positioner is driven by a horizontal motion stepper motor 388' which drives a screw shaft 387' and follower assembly 386'. The horizontal position of the positioner is detected by an X position encoder 388a which is connected to the end of the screw shaft and produces an electronic signal representative of the S position which is communicated to the computer 202. The X positioning stage 380' also includes an X position limit switch 379.

A similar arrangement is used to vertically position the Y stage of the X—Y positioner which mounts the X stage slide rods 382' upon which the X stage and chuck mounting head are mounted. The Y stage includes a slidably mounted stage piece 374' to which the X stage is mounted. The Y stage is driven by a stepper motor 378' via a lead screw 377' and screw follower assembly 376'. Y position encoder 378a provides an electronic signal indicative of the position of the Y stage. A Y position limit switch 389 is also advantageously included.

FIG. 15 shows the basic operation which both translates and rotates the chuck 200 as the chuck is moved from the badge engaging position into a reading position shown at the left in phantom in FIG. 15. This positions the dosimeter being held with the interior face outwardly adjacent to opening 594. The stimulating laser beams impinge upon the dosimeter elements causing an emission which is collected by the emission collector assembly and detected by photomultiplier tube 350.

Although description has been made of one type of positioner for the dosimeter badge chuck assembly, the invention is not to be construed as requiring any particular form of positioner for the chuck assembly and a variety of robotic arms, X—Y positioners, rotational positioners and others are alternatively possible.

A small radioactive light source 980 is also preferably mounted on the X stage 380' for use as a calibrating light detected by detector 350 when the source 980 is properly positioned. An incandescent spot 981 can also be included for heating by the laser or other stimulating beam to incandescence also for calibrating the detection of emissions. A protection plate 983 is further shown for covering the laser emission and detection opening (not shown).

FIG. 16 shows a preferred form of control system which can be used to operate the parts of dosimeter reader 100 relevant to the present invention. The control system includes an on-board computer 202. The computer receives information from the X and Y encoders 376 and 386 and produces signals which drive the X and Y stepper motors 373 and 383 to desired positions. Data storage is coordinated through the computer to a data storage unit 401. The computer can also drive an internal or external printer 402 which prints dose exposure related emission information in a variety of forms as desired. The computer receives the emission information from the emission detector 350. Laser optics unit 340 is preferably adjustable and controlled to provide two different types of stimulating laser beams to read different types of dosimeters mounted on a suitable badge. The X and Y position limit swiches 379 and 389 are also connected to computer 202 to indicate full travel of the positioning stages. The computer 202 is preferably programmed to provide automatic operation of the dosimeter badge reader. Badge actuator limit switches 297 and 298 are also connected to computer 202.

The invention further includes novel methods for reading and stimulating dosimeters and dosimeter badges. In a first embodiment the invention includes methods which use two different stimulating laser beams to treat one or more dosimeters. The method advantageously includes positioning a dosimeter in a reading position wherein the dosimeter is appropriately located for receiving a stimulating beam or beams. An incoming laser beam 16a is preferably converted into a desired stimulating laser beam such as by passing the incoming beam through an optical laser converter to produce a stimulating laser beam. For example, the incoming laser beam can be converted by positioning the laser converter block 502 with the second optical pathway 520 positioned to receive the incoming laser beam. The incoming laser beam is then passed through the converter second optical pathway 520 to produce the focused second stimulating beam. The dosimeter is then stimulated such as by impinging the second stimulating laser beam upon the dosimeter. In a preferred form of the invention the second stimulating beam is impinged upon numerous localized areas of a dosimeter. The methods are advantageously further defined to include detecting an emission or emissions from the dosimeter as a result of treatment by the stimulating beam. When the dosimeter is stimulated numerous times by the stimulating beam the resulting numerous emission phenomenon are detected. The detected emissions are then preferably recorded.

The novel method further advantageously includes converting the laser beam to produce a different laser beam having differing laser beam characteristics. The converting step is advantageously accomplished by moving portions of a laser beam converter, such as converter block 502 into a position wherein the incoming laser beam passes through the first optical pathway 510 to produce a subsequent stimulating laser beam, such as the first stimulating laser beam, having laser beam characteristics which are different from the previous stimulating beam, such as the second laser beam characteristics. For example a dosimeter read to measure ionization at numerous discrete locations using the focused second laser beam can subsequently be treated by the relatively larger, equalized first stimulating laser beam to anneal the dosimeter prior to reuse. Emission from the dosimeter during such an annealing step can optionally be detected to monitor the annealing process. It is also possible to use a pre-reading annealing process to remove relatively unreliable luminescent energy which is unstable and luminesces at a lower stimulation temperature.

In other embodiments of the novel methods of this invention processes are provided for reading multiple types of dosimeters contained on a single dosimeter badge using a multiple step treatment process and at least two differing types of stimulating laser beams which have differing characteristics. The differing stimulating laser beams are advantageously produced by converting an incoming laser beam using at least one optical laser converter which is adjustable to provide two differing output beams, preferably using at least one optical pathway which changes the characteristics of an incoming laser beam in at least one of two possible positions of the laser converter. More preferably, the optical laser converter transforms the incoming laser beam into two different output stimulating laser beams each of which is optically changed to provide differing desired laser beam characteristics.

The novel methods can be defined to include positioning a first dosimeter in a reading position, such as by moving the dosimeter held in a dosimeter badge in a desired position aligned to receive a stimulating laser beam such as the first stimulating beam produced by passing the incoming laser beam through the first optical pathway 510. The methods can also be defined to include moving at least a movable portion of the optical laser converter to provide an optical pathway which produces the desired stimulating beam characteristics. For example, the laser converter block 502 is positioned with the first optical pathway aligned to receive the incoming laser beam. The optical pathway can provide means for changing or converting the incoming laser beam to produce a changed beam with desired laser beam characteristics, such as by equalizing the incoming beam by passing it through the first optical beam pathway 510 to produce an equalized first stimulating laser beam having a more uniform cross-sectional laser power profile than the incoming laser beam. The first optical pathway can further advantageously provide a converted beam having a square cross-sectional beam shape, such as by passing the beam through an equalizing channel having a square beam shape. Alternatively, the channel can have other cross-sectional shapes to provide a beam pattern which matches the shape of the dosimeter being treated.

The novel methods further include stimulating or otherwise treating the first dosimeter with a first stimulating beam having the desired first stimulating beam characteristics. This is advantageously accomplished by beaming the stimulating laser beam onto the first dosimeter which has been positioned in the appropriate first dosimeter reading position.

The novel methods further advantageously include converting the incoming laser beam into a desired second stimulating laser beam. This is advantageously accomplished by moving at least portions of an adjustable laser beam converter, such as by rotating the converter block assembly 502 to align the second optical pathway with the incoming laser beam 16a. The incoming laser beam is preferably converted by the second optical pathway to produce a second stimulating laser beam having desired treatment properties for a second dosimeter carried on a dosimeter badge. The second dosimeter is placed in appropriate position for receiving the second stimulating laser beam, such as by positioning the second dosimeter in a second dosimeter reading position which can be the same or different from the first dosimeter reading position. In preferred embodiments the first and second dosimeter reading positions are approximately along the same stimulating beam axis emitted through the opening 594. The first and second dosimeter reading positions can vary in longitudinal position, but are more preferably as close to the opening 594 as practicable to increase the emission collection efficiency of the reader, thereby increasing minimum dose sensitivity.

The methods further include stimulating or otherwise treating the second dosimeter with the second stimulating laser beam. The emission produced by the treatment of the second dosimeter is preferably detected, such as by detecting the emission with the photomultiplier 350. The emission can be collected, such as by using the ellipsoidal reflector 593 or other otherwise collecting and conveying the emission from the dosimeter to the emission detector. The emission information is preferably recorded and used to produce an indication of radiation dose to which the dosimeter was exposed.

Although the novel methods described above have been presented in the context of the preferred dosimeter reading apparatus having two optical pathways, it should further be appreciated that other multiple optical pathway converters having more than two pathways, and reading and stimulating processes having more than two steps or which include more than two dosimeters are also included in this invention.

The apparatus according to this invention are constructed by appropriately forming the various components indicated above from suitable materials, such as metals and synthetic polymers, to serve the desired function. The components are fabricated in traditional manners using such materials and assembled into the indicated structures.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

We claim:

1. A convertible radiation dosimeter reading apparatus for performing a plurality of differing laser stimulated reading modes of operation; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beams and controllably converting the laser beam into a plurality of output laser beams having differing characteristics to provide differing stimulating laser beams to read radiation dosimeters in a plurality of reading modes;

an emission detector for measuring emission from a dosimeter which has been stimulated by at least one of the stimulating laser beams;

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

wherein the laser beam converts further comprises at least one output beam splitter for splitting at least one of the output laser beams into a secondary output beam.

2. A convertible radiation dosimeter reading apparatus for performing a plurality of differing laser stimulated reading modes of operation; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of output laser beams having differing characteristics to provide differing stimulating laser beams to read radiation dosimeters in plurality of reading modes;

an emission detector for measuring emission from a dosimeter which has been stimulated by at least one of the stimulating laser beams;

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

wherein the laser beam converter further comprises:

at least one output beam splitter for splitting at least one of the output laser beams into a secondary output beam;

at least one secondary output beam detector for detecting a characteristic of the secondary output beam.

3. A convertible radiation dosimeter reading apparatus for performing a plurality of differing laser stimulated reading modes of operation; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of output laser beams having differing characteristics to provide differing stimulating laser beams to read radiation dosimeters in a plurality of reading modes;

an emission detector for measuring emission from a dosimeter which has been stimulated by at least one of the stimulating laser beams;

a frame;

a frame subunit mounted upon the frame for adjustable movement between a plurality of positions including at least a first subframe position and a second subframe position;

a first optical pathway through the frame subunit; and first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

wherein the laser beam converter further comprises at least one beam equalizer for equalizing the cross-sectional power density of at least one of the output laser beams.

4. A convertible radiation dosimeter reading apparatus for performing a plurality of differing laser stimulated reading modes of operating; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of output laser beams having differing characteristics to provide differing stimulating laser beams to read radiation dosimeters in a plurality of reading modes;

an emission detector for measuring emission from a dosimeter which has been stimulated by at least one of the stimulating laser beams;

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

wherein the laser beam converter further comprises at least one beam equalizer for equalizing the cross-sectional power density of at least one of the output laser beams; said beam equalizer including an optically transmissive channel having interior walls which are reflective of the laser beam transmitted therethrough.

5. A convertible radiation dosimeter reading apparatus for performing a plurality of differing laser stimulated reading modes of operation; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of output laser beams having differing characteristics to provide differing stimulating laser beams to read radiation dosimeters in a plurality of reading modes;

an emission detector for measuring emission from a dosimeter which has been stimulated by at least one of the stimulating laser beams;

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

whereing the laser beam converter further comprises at least one beam equalizer for equalizing the cross-sectional power density of at least of the output laser beams; said beam equalizer including an optically transmissive channel having interior walls which are reflective of the laser beam transmitted therethrough, and a lens for dispersing the laser beam along the interior walls.

6. A convertible radiation dosimeter reading apparatus for performing a plurality of differing laser stimulated reading modes of operation; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of output laser beams having differing characteristics to provide differing stimulating laser beams to read radiation dosimeters in a plurality of reading modes;

an emission detector for measuring emission from a dosimeter which has been stimulated by at least one of the stimulating laser beams;

a frame;

a frame subunit mounted upon the frame for adjustable movement between a plurality of positions including at least a first subframe position and a second subframe position;

a first optical pathway through the frame subunit; said first optical pathway serving to receiving the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe positions;

wherein the laser beam converter further comprises at least one laser beam power reducer included along at least one of the optical pathways to reduce the power of at least one of the output laser beams; said laser beam power reducer including a beam splitter for reflecting a portion of the laser beam to thereby reduce power of the laser beam.

7. A convertible radiation dosimeter reading apparatus for performing a plurality of differing laser stimulated reading modes of operation; the laser stimulated reading modes each measuring a state of ionization of at least one type of radiation sensing element which results from exposure of the radiation sensing element of ionizing radiation, comprising:

a laser beam source for providing a laser beams;

a laser beam converter for receiving said laser beam and controllably converting the laser beam into a plurality of output laser beams having differing characteristics to provide differing stimulating laser beams to read radiation dosimeters in a plurality of reading modes;

an emission detector for measuring emission from a dosimeter which has been stimulated by at least one of the stimulating laser beams;

a frame;

a frame subunit mounted upon the frame for adjustable movement between a plurality of positions including at least a first subframe position and a second subframe position;

a first optical pathway through the frame subunit; said first optical pathway serving to receiving the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

wherein the laser beam converter further comprises a beam dump for receiving a secondary laser beam split by a beam splitter to dissipate the power thereof.

8. A convertible radiation dosimeter reading apparatus for performing a plurality of differing laser stimulated reading modes of operation; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of output laser beams having differing characteristics to provide differing stimulating laser beams to read radiation dosimeters in a plurality of reading modes;

an emission detector for measuring emission from a dosimeter which has been stimulated by at least one the stimulating laser beams;

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

wherein the laser beam converter further comprises at least one laser beam power reducer included along at least one of the optical pathways to reduce the power of at least one of the output laser beams; said laser beam power reducer including a beam splitter for reflecting a portion of the laser beam to thereby reduce power of the laser beam; said beam splitter being positioned to split an incoming laser beam.

9. A convertible radiation dosimeter reading apparatus for performing a plurality of differing laser stimulated reading modes of operation; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of output laser beams having differing characteristics to provide differing stimulating laser beams to read radiation dosimeters in a plurality of reading modes;

an emission detector for measuring emission from a dosimeter which has been stimulated by at least one of the stimulating laser beams;

a frame;

a frame subunit mounted upon the frame of adjustable movement between a plurality of positions including at least in a first subframe position and a second subframe position;

a first optical pathway through the frame subunit; said first optical pathway serving to receive the laser beam and produce a first output laser beam with first output laser characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

wherein the laser beam converter further comprises at least one laser beam power reducer included along at least one of the optical pathways to reduce the power of at least one of the output laser beams; said laser beam power reducer including a beam splitter for reflecting a portion of the laser beam to thereby reduce power of the laser beam; said beam splitter being positioned to split an output laser beam.

10. A convertible radiation dosimeter reading apparatus for performing a plurality of differing laser stimulated reading modes of operation; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of ouput laser beams having differing characteristics to provide differing stimulating laser beams to read radiation dosimeters in a plurality of reading modes;

an emission detector for measuring emission from a dosimeter which has been stimulated by at least one of the stimulating laser beams;

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

whereing the laser beam converter further comprises at least one laser beam power reducer included along at least one of the optical pathways to reduce the power of at least one of the output laser beams; said laser beam power reducer including at least oen aperture adjacent at least one lens to thereby reduce power of the laser beam.

11. A convertible radiation dosimeter reading apparatus for performing a plurality of differing laser stimulating reading modes of operation; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of output laser beams having differing characteristics to provide differing stimulating laser beams to read radiation dosimeters in a plurality of reading modes;

an emission detector for measuring emission from a dosimeter which has been stimulated by at least one of the stimulating laser beams;

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output. laser beam with first output laser beam characteristics when the frame subunit is positioned in the first subframe position;

a second optical pathway through the frame subunit; said second optical pathway serving to receive the laser beam and produce a second output laser beam with 'second output laser beam characteristics when the frame subunit is positioned in the second subframe position;

wherein the laser beam converter further comprises at least one laser beam power reducer included along at least one of the optical pathways to reduce the power of at least one of the output laser beams; said laser beam power reducer including a lens and an aperture adjacent the lens to thereby reduce power of the laser beam.

12. A laser beam converter for use in a phosphor reading apparatus which includes a laser beam for stimulating a phosphor sample to cause an emission therefrom, the laser beam converter allowing the phosphor reading apparatus to produce a plurality of phosphor stimulating output laser beams having a plurality of differing characteristics, comprising:

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

at least one output beam splitter for splitting at least one of the output laser beams into a secondary output beam;

at least one specimen opening formed to allow the stimulating output laser beams to be beamed onto said phosphor sample.

13. A laser beam converter for use in a phosphor reading apparatus which includes a laser beam for stimulating a phosphor sample to cause an emission therefrom, the laser beam converter allowing the phosphor reading apparatus to produce a plurality of phosphor stimulating output laser beams having a plurality of differing characteristics, comprising:
  a frame;
  a frame subunit mounted upon the frame for adjustable movement between a plurality of positions including at least a first subframe position and a second subframe position;
  a first optical pathway through the frame subunit; said first optical pathway serving to receive the laser beam and produce a first output laser beam with first output laser beam characteristics when the frame subunit is positioned in the first subframe position;
  a second optical pathway through the frame subunit; said second optical pathway serving to receive the laser beam and produce a second output laser beam with second output laser beam characteristics when the frame subunit is positioned in the second subframe position;
  at least one output beam splitter for splitting at least one of the output laser beams into a secondary output beam;
  at least one secondary output beam detector for detecting a characteristic of the secondary output beam;
  at least one specimen opening formed to allow the stimulating output laser beams to be beamed onto said phosphor sample.

14. A laser beam converter for use in a phosphor reading apparatus which includes a laser beam for stimulating a phosphor sample to cause an emission therefrom, the laser beam converter allowing the phosphor reading apparatus to produce a plurality of phosphor stimulating output laser beams having a plurality of differing characteristics, comprising:
  a frame;
  a frame subunit mounted upon the frame for adjustable movement between a plurality of positions including at least a first subframe position and a second subframe position;
  a first optical pathway through the frame subunit; said first optical pathway serving to receive the laser beam and produce a first output laser beam with first output laser beam characterstics when the frame subunit is positioned in the first subframe position;
  a second optical pathway through the frame subunit; said second optical pathway serving to receive the laser beam and produce a second output laser beam with second output laser beam characteristics when the frame subunit is positioned in the second subframe position;
  at least one beam equalizer for equalizing the cross-sectional power density of at least one of the output laser beams;
  at least one specimen opening formed to allow the stimulating output laser beams to be beamed onto said phosphor sample.

15. A laser beam converter according to claim 14 and further comprising an imaging assembly for imaging the output laser beams passing through the optical pathways into a desired image.

16. A convertible radiation dosimeter reading apparatus according to claim 14 wherein the laser beam converter further comprises:
  at least one output beam splitter for splitting at least one of the output laser beams into a secondary output beam;
  at least one secondary output beam detector for detecting a characteristic of the secondary output beam.

17. A convertible radiation dosimeter reading apparatus according to claim 16 wherein said secondary output beam detector detects power of the secondary output beam.

18. A convertible radiation dosimeter reading apparatus according to claim 17 and further comprising at least one laser beam power reducer for reducing the power of at least one of said output laser beams.

19. A laser beam converter for use in a phosphor reading apparatus which includes a laser beam for stimulating a phosphor sample to cause an emission therefrom, the laser beam converter allowing the phosphor reading apparatus to produce a plurality of phosphor stimulating output laser beams having a plurality of differing characteristics, comprising:
  a frame;
  a frame subunit mounted upon the frame for adjustable movement between a plurality of positions including at least a first subframe position and a second subframe position;
  a first optical pathway through the frame subunit; said first optical pathway serving to receive the laser beam and produce a first output laser beam with first output laser beam characteristics when the frame subunit is positioned in the first subframe position;
  a second optical pathway through the frame subunit; said second optical pathway serving to receive the laser beam and produce a second output laser beam with second output laser beam characteristics when the frame subunit is positioned in the second subframe position;
  at least one beam equalizer for equalizing the cross-sectional power density of at least one of the output laser beams; said beam equalizer including an optically transmissive channel having interior walls which are reflective of the laser beam transmitted therethrough;
  at least one specimen opening formed to allow the stimulating output laser beams to be beamed onto said phosphor sample.

20. A laser beam converter for use in a phosphor reading apparatus which includes a laser beam for stimulating a phosphor sample to cause an emission therefrom, the laser beam converter allowing the phosphor reading apparatus to produce a plurality of phosphor stimulating output laser beams having a plurality of differing characteristics, comprising:
  a frame;
  a frame subunit mounted upon the frame for adjustable movement between a plurality of positions including at least a first subframe position and a second subframe position;
  a first optical pathway through the frame subunit; said first optical pathway serving to receive the laser beam and produce a first output laser beam with first output beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

at least one beam equalizer for equalizing the cross-sectional power density of at least one of the output laser beams; said beam equalizer including an optically transmissive channel having interior walls which are reflective of the laser beam transmitted therethrough, and a lens for dispersing the laser beam along the interior walls;

at least one specimen opening formed to allow the stimulating output laser beams to be beamed onto said phosphor sample.

21. A laser beam converter for use in a phosphor reading apparatus which includes a laser beam for stimulating a phosphor sample to cause an emission therefrom, the laser beam converter allowing the phosphor reading apparatus to produce a plurality of phosphor stimulating output laser beams having a plurality of differing characteristics, comprising:

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second ouput laser beam with second output laser beam characteristics when the frame subunit is positioned in the second subframe position;

at least one laser beam powder reducer included along at least one of the optical pathways to reduce the power of at least one of the output laser beams;

at least one specimen opening formed to allow the stimulating output laser beams to be beamed onto said phosphor sample.

22. A laser beam converter for use in a phosphor reading apparatus which includes a laser beam for stimulating a phosphor sample to cause an emission therefrom, the laser beam converter allowing the phosphor reading apparatus to produce a plurality of phosphor stimulating output laser beams having a plurality of differing characteristics, comprising:

a frame;

a frame subunit mounted upon the frame for adjustable movement between a plurality of positions including at least a first subframe position and a second subframe position; a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

at least one laser beam power reducer included along at least one of the optical pathways to reduce the power of at least one of the output laser beams; said laser beam power reducer including a beam splitter for reflecting a portion of the laser beam to thereby reduce power of the laser beam;

at least one specimen opening formed to allow the stimulating output laser beams to be beamed onto said phosphor sample.

23. A laser beam converter according to claim 22 and further comprising a beam dump for receiving a secondary laser beam split by the beam splitter to dissipate the power thereof.

24. A laser beam converter for use in a phosphor reading apparatus which includes a laser beam for stimulating a phosphor sample to cause an emission therefrom, the laser beam converter allowing the phosphor reading apparatus to produce a plurality of phosphor stimulating output laser beams having a plurality of differing characteristics, comprising:

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

at least one laser beam power reducer included along at least one of the optical pathways to reduce the power of at least one of the output laser beams; said laser beam power reducer including a beam splitter for reflecting a portion of the laser beam to thereby reduce power of the laser beam; said beam splitter being positioned to split an incoming laser beam;

at least one specimen opening formed to allow the stimulating output laser beams to be beamed onto said phosphor sample.

25. A laser beam converter for use in a phosphor reading apparatus which includes a laser beam for stimulating a phosphor sample to cause an emission therefrom, the laser beam converter allowing the phosphor reading apparatus to produce a plurality of phosphor stimulating output laser beams having a plurality of differing characteristics, comprising:

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

at least one laser beam power reducer included along at least one of the optical pathways to reduce the power of at least one of the output laser beams; said laser beam power reducer including a beam splitter for reflecting a portion of the laser beam to thereby reduce power of the laser beam; said beam splitter being positioned to split an output laser beam;

at least one specimen opening formed to allow the stimulating output laser beams to be beamed onto said phosphor sample.

26. A laser beam converter for use in a phosphor reading apparatus which includes a laser beam for stimulating a phosphor sample to cause an emission therefrom, the laser beam converter allowing the phosphor reading apparatus to produce a plurality of phosphor stimulating output laser beams having a plurality of differing characteristics, comprising:

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

at least one laser beam power reducer included along at least one of the optical pathways to reduce the power of at least one of the output laser beams; said laser beam power reducer including at least one aperture to thereby reduce power of the laser beam;

at least one specimen opening formed to allow the stimulating output laser beams to be beamed onto said phosphor sample.

27. A laser beam converter for use in a phosphor reading apparatus which includes a laser beam for stimulating a phosphor sample to cause an emission therefrom, the laser beam converter allowing the phosphor reading apparatus to produce a plurality of phosphor stimulating output laser beams having a plurality of differing characteristics, comprising:

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

at least one laser beam power reducer included along at least one of the optical pathways to reduce the power of at least one of the output laser beams; said laser beam power reducer including a lens and an aperture adjacent the lens to thereby reduce power of the laser beam;

at least one specimen opening formed to allow the stimulating output laser beams to be beamed onto said phosphor sample.

28. A laser beam converter for receiving a laser beam and controllably converting the laser beam into a plurality of output laser beams having differing characteristics, comprising:

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

at least one output beam splitter for splitting at least one of the output laser beams into a secondary output beam.

29. A laser beam converter for receiving a laser beam and controllably converting the laser beam into a plurality of output laser beams having differing characteristics, comprising:

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; and second optical pathway serving to receive the laser beam and produce a second output laser beam with second output laser beam characteristics when the frame subunit is positioned in the second subframe position;

at least one output beam splitter for splitting at least one of the output laser beams into a secondary output beam;

at least one secondary output beam detector for detecting a characteristic of the secondary output beam.

30. A laser beam converter for receiving a laser beam and controllably converting the laser beam into a plurality of output laser beams having differing characteristics, comprising:

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second ouput laser beam with second output laser beam characteristics when the frame subunit is positioned in the second subframe position;

at least one beam equalizer for equalizing the cross-sectional power density of at least one of the output laser beams.

31. A laser beam converter according to claim 30 and further comprising an imaging assembly for imagining the output laser beams passing through the optical pathways into a desired image.

32. A laser beam converter for receiving a laser beam and controllably converting the laser beam into a plurality of output laser beams having differing characteristics, comprising:

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

at least one beam equalizer for equalizing the cross-sectional power density of at least one of the output laser beams; said beam equalizer including an optically transmissive channel having interior walls which are reflective of the laser beam transmitted therethrough.

33. A laser beam converter for receiving a laser beam and controllably converting the laser beam into a plurality of output laser beams having differing characteristics, comprising:

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

at least one beam equalizer for equalizing the cross-sectional power density of at least one of the output laser beams; said beam equalizer including an optically transmissive channel having interior walls which are relective of the laser beam transmitted therethrough, and a lens for dispersing the laser beam along the interior walls.

34. A laser beam converter for receiving a laser beam and controllably converting the laser beam into a plurality of output laser beams having differing characteristics, comprising:

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; said second optical pathway serving to receive the laser beam and produce a second output laser beam with second output laser beam characteristics when the frame subunit is positioned in the second subframe position;

at least one laser beam power reducer included along at least one of the optical pathways to reduce the power of at least one of the output laser beams.

35. A laser beam converter for receiving a laser beam and controllably converting the laser beam into a plurality of output laser beams having differing characteristics, comprising:

a frame;

a frame subunit mounted upon the frame for adjustable movement between a plurality of positions including at least a first subframe position and a second subframe position;

a first optical pathway through the frame subunit; said first optical pathway serving to receive the laser beam and produce a first output laser beam with first output laser beam characteristics when the frame subunit is positioned in the first subframe position;

a second optical pathway through the frame subunit; a second optical pathway serving to receive the laser beam and produce a second output laser beam with second output laser beam characteristics when the frame subunit is positioned in the second subframe position;

at least one laser beam power reducer included along at least one of the optical pathways to reduce the power of at least one of the output laser beams; said laser beam power reducer including a beam splitter for reflecting a portion of the laser beam to thereby reduce power of the laser beam.

36. A laser beam converter according to claim 35 and further comprising a beam dump for receiving a secondary laser beam split by the beam splitter to dissipate the power thereof.

37. A laser beam converter for receiving a laser beam and controllably converting the laser beam into a plurality of output laser beams having differing characteristics, comprising:
- a frame;
- a frame subunit mounted upon the frame for adjustable movement between a plurality of positions including at least a first subframe position and a second subframe position;
- a first optical pathway through the frame subunit; said first optical pathway serving to receive the laser beam and produce a first output laser beam with first output laser beam characteristics when the frame subunit is positioned in the first subframe position;
- a second optical pathway through the frame subunit; said second optical pathway serving to receive the laser beam and produce a second output laser beam with second output laser beam characteristics when the frame subunit is positioned in the second subframe position;
- at least one laser beam power reducer included along at least one of the optical pathways to reduce the power of at least one of the output laser beams; said laser beam power reducer including a beam splitter for relecting a portion of the laser beam to thereby reduce power of the laser beam; said beam splitter being positioned to split an incoming laser beam.

38. A laser beam converter for receiving a laser beam and controllably converting the laser beam into a plurality of output laser beams having differing characteristics, comprising:
- a frame;
- a frame subunit mounted the frame for adjustable movement between a plurality of positions including at least a first subframe position and a second subframe position;
- a first optical pathway through the frame subunit; said first optical pathway serving to receive the laser beam and produce a first output laser beam with first output laser beam characteristics when the frame subunit is positioned in the first subframe position;
- a second optical pathway through the frame subunit; said second optical pathway serving to receive the laser beam and produce a second output laser beam with second output laser beam characteristics when the frame subunit is positioned in the second subframe position;
- at least one laser beam power reducer included along at least one of the optical pathways to reduce the power of at least one of the output laser beams; said laser beam power reducer including a beam splitter for reflecting a portion of the laser beam to thereby reduce power of the laser beam; said beam splitter being positioned to split an output laser beam.

39. A laser beam converter for receiving a laser beam and controllably converting the laser beam into a plurality of output laser beams having differing characteristics, comprising:
- a frame;
- a frame subunit mounted upon the frame for adjustable movement between a plurality of positions including at least a first subframe position and a second subframe position;
- a first optical pathway through the frame subunit; said first optical pathway serving to receive the laser beam and produce a first output laser beam with first output laser beam characteristics when the frame subunit is positioned in the first subframe position;
- a second optical pathway through the frame subunit; said second optical pathway serving to receive the laser beam and produce a second output laser beam with second output laser beam characteristics when the frame subunit is positioned in the second subframe position;
- at least one laser beam power reducer included along at least one of the optical pathways to reduce the power of at least one of the output laser beams; said laser beam power reducer including at least one aperture to reduce power of the laser beam.

40. A laser beam converter for receiving a laser beam and controllably converting the laser beam into a plurality of output laser beams having differing characteristics, comprising;
- a frame;
- a frame subunit mounted upon the frame for adjustable movement between a plurality of positions including at least a first subframe position and a second subframe position;
- a first optical pathway through the frame subunit; said first optical pathway serving to receive the laser beam and produce a first output laser beam with first output laser beam characteristics when the frame subunit is positioned in the first subframe position;
- a second optical pathway through the frame subunit; said second optical pathway serving to receive the laser beam and produce a second output laser beam with second output laser beam characteristics when the frame subunit is positioned in the second subframe position;
- at least one laser beam power reducer included along at least one of the optical pathways to reduce the power of at least one of the output laser beams; said laser beam power reducer including a lens ans an aperture adjacent the lens to thereby reduce power of the laser beam .

41. A method for reading a dosimeter badge having at least one dosimeter which requires treatment with a plurality of stimulating laser beams having differing beam characteristics:
- positioning a dosimeter in at least one reading position;
- stimulating the dosimeter with a first stimulating laser beam;
- stimulating the dosimeter with a second stimulating laser having beam characteristics different from said first stimulating laser beam;
- where at least one of said stimulating steps includes stimulating with a laser beam which has been equalized to provide a more uniform laser beam power density;
- wherein the first stimulating beam is equalized and the second stimulating beam is focused.

42. A method for reading a dosimeter badge having at least two dosimeters which require treatment with a plurality of stimulating laser beams having differing beam characteristics:
- positioning a first dosimeter in a reading position;
- stimulating the first dosimeter with a first stimulating laser beam;
- positioning a second dosimeter in a reading position;

stimulating the second dosimeter with a second stimulating laser beam having beam characteristics different from said first stimulating laser beam;

moving a laser converter to controllably convert a laser beam between said first stimulating laser beam and said second stimulating laser beam;

said first and second dosimeters being stimulated in the same reading position.

43. A method according to claim 42 further comprising splitting at least one of said stimulating laser beams.

44. A method according to claim 42, further comprising splitting an output stimulating laser beam to produce a secondary output laser beam;

detecting the power of the secondary output laser beam.

45. A method according to claim 42 wherein at least one of said stimulating steps includes stimulating with a laser beam which has been equalized to provide a more uniform laser beam power density.

46. A method according to claim 42 wherein at least one of said stimulating steps includes stimulating with a laser beam which has been focused to provide a small stimulating laser beam less than 100 microns in width.

47. A method according to claim 42 wherein the first stimulating beam is equalized and the second stimulating beam is focused.

48. A method according to claim 42 further comprising reducing beam power of at least one of said stimulating laser beams.

49. A method according to claim 42 further comprising reducing beam power of at least one of said stimulating laser beams by splitting an incoming laser beam.

50. A method according to claim 42 further comprising reducing beam power of at least one of said stimulating laser beams by passing the laser beam through an aperture.

51. A method according to claim 42 further comprising detecting enission from at least one of said dosimeters as a result of at least one of said stimulating steps.

52. A method according to claim 42 further comprising equalizing at least one of said laser beams to provide an equalized stimulating laser beam to provide a more uniform laser beam power density.

53. A method according to claim 52 wherein said equalizing is at least partially accomplished by passing a laser beam through an optical channel having reflective walls.

54. A method for reading a dosimeter badge having at least one dosimeter which requires treatment with a plurality of stimulating laser beams having differing beam characteristics:

positioning a dosimeter in at least one reading position;

stimulating the dosimeter with a first stimulating laser beam;

stimulating the dosimeter with a second stimulating laser having beam characteristics different from said first stimulating laser beam;

wherein at least one of said stimulating steps includes stimulating with a laser beam which has been equalized to provide a more uniform laser beam power density;

reducing beam power of at least one of said stimulating laser beams by passing the laser beam through an aperture.

55. A convertible radiation dosimeter reading apparatus for performing a plurality of differing laser stimulated reading modes of operation; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of output laser beams having differing characteristics to provide differing stimulating laser beams to read radiation dosimeters in a plurality of reading modes;

an emmission detector for measuring emission from a dosimeter which has been stimulated by at least one of the stimulating laser beams;

wherein the laser beam converter further comprises at least one output beam splitter for splitting at least one of the output laser beams into a secondary output beam.

56. A convertible radiation dosimeter reading apparatus for performing a plurality of differing laser stimulated reading modes of operation; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of output laser beams having differing characteristics to provide differing stimulating laser beams to read radiation dosimeters in a plurality of reading modes;

an emission detector for measuring emission from a dosimeter which has been stimulated by at least one of the stimulating laser beams;

wherein the laser beam converter further comprises:

at least one output beam splitter for splitting at least one of the output laser beams into a secondary output beam;

at least one secondary output beam detector for detecting a characteristic of the secondary output beam.

57. A convertible radiation dosimeter reading apparatus according to claim 56 wherein said secondary output beam detector detects power of the secondary output beam.

58. A convertible radiation dosimeter reading apparatus according to claim 56 wherein said secondary output beam detector detects power of the secondary output beam; and further comprising at least one beam equalizer for equalizing the power density of at least one of the output laser beams.

59. A convertible radiation dosimeter reading apparatus for performing a plurality of differing laser stimulated reading modes of operation; the laser stiumulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of output laser beams having differing characteristics to provide differing stimulating laser beams to read radiation dosimeters in a plurality of reading modes;

an emission detector for measuring emission from a dosimeter which has been stimulated by at least one of the stimulating laser beams;

wherein the laser beam converter further comprises at least one laser beam power reducer to reduce the power of at least one of the output laser beams; said laser beam power reducer including a beam splitter for reflecting a portion of the laser beam to thereby reduce power of the laser beam;

wherein the laser beam converter further comprises a beam dump for receiving a secondary laser beam split by the beam splitter to dissipate the power thereof.

60. A convertible radiation dosimeter reading apparatus for performing a plurality of differing laser stimulated reading modes of operation; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of output laser beams having differing characteristics to provide differing stimulating laser beams to read radiation dosimeters in a plurality of reading modes;

an emission detector for measuring emission from a dosimeter which has been stimulated by at least one of the stimulating laser beams;

wherein the laser beam converter further comprises at least one laser beam power reducer to reduce the power of at least one of the output laser beams; said laser beam power reducer including a beam splitter for reflecting a portion of the laser beam to thereby reduce power of the laser beam;

wherein said beam splitter is positioned to split an output laser beam.

61. A convertible radiation dosimeter reading apparatus for performing a plurality of differing laser stimulated reading modes of operation; the laser stimulated reading modes each measuring a state of ionization of at least one type of radiation sensing element which results from exposure of the radiation sensing element to ionizing radiation, comprising:

a laser beam source for providing a laser beam;

a laser beam converter for receiving said laser beam and controllably converting the laser beam into a plurality of output laser beams having differing characteristics to provide differing stimulating laser beams to read radiation dosimeters in a plurality of reading modes;

an emission detector for measuring emission from a dosimeter which has been stimulated by at least one of the stimulating laser beams;

wherein the laser beam converter further comprises at least one laser beam power reducer to reduce the power of at least one of the output laser beams; said laser beam power reducer including a lens and an aperture adjacent the lens to thereby reduce power of the laser beam.

* * * * *